United States Patent
Matsumoto

(10) Patent No.: US 10,340,539 B2
(45) Date of Patent: Jul. 2, 2019

(54) POWER CONDITIONING SYSTEM AND CONTROL METHOD THEREFOR

(71) Applicant: NISSAN MOTOR CO., LTD., Yokohama-shi, Kanagawa (JP)

(72) Inventor: Michihiko Matsumoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/574,696

(22) PCT Filed: May 21, 2015

(86) PCT No.: PCT/JP2015/064628
§ 371 (c)(1),
(2) Date: Nov. 16, 2017

(87) PCT Pub. No.: WO2016/185608
PCT Pub. Date: Nov. 24, 2016

(65) Prior Publication Data
US 2018/0123152 A1     May 3, 2018

(51) Int. Cl.
*H01M 8/04* (2016.01)
*H01M 8/04537* (2016.01)
(Continued)

(52) U.S. Cl.
CPC ......... *H01M 8/04649* (2013.01); *B60L 58/40* (2019.02); *H01M 8/0488* (2013.01);
(Continued)

(58) Field of Classification Search
None
See application file for complete search history.

(56) References Cited

U.S. PATENT DOCUMENTS

| 2010/0112398 A1 | 5/2010 | Imamura et al. |
| 2011/0300461 A1 | 12/2011 | Manabe et al. |
| 2012/0107709 A1 | 5/2012 | Mori et al. |

FOREIGN PATENT DOCUMENTS

| DE | 102014011768 A1 * | 2/2015 | ............. B60L 11/18 |
| EP | 2 112 706 A1 | 10/2009 | |

(Continued)

*Primary Examiner* — Ula C Ruddock
*Assistant Examiner* — Tony S Chuo
(74) *Attorney, Agent, or Firm* — Foley & Lardner LLP

(57) ABSTRACT

A power conditioning system includes a fuel cell connected to a load, a fuel cell converter connected between the fuel cell and the load and converting an output voltage of the fuel cell at a predetermined required voltage ratio, a battery connected to the load in parallel to the fuel cell and serving as a power supply source different from the fuel cell, and a battery converter connected between the battery and the load and converting an output voltage of the battery at a predetermined required voltage ratio. The power conditioning system includes a current bypass path configured to couple the fuel cell and the load while bypassing the fuel cell converter, an alternating-current voltage application unit configured to apply an alternating-current voltage signal to an output side of the fuel cell converter, and an internal state estimation unit configured to estimate an internal state of the fuel cell on the basis of a predetermined physical quantity when the alternating-current voltage signal was applied by the alternating-current voltage application unit.

12 Claims, 16 Drawing Sheets

(51) Int. Cl.
*H01M 8/04223* (2016.01)
*H01M 8/0432* (2016.01)
*H01M 8/04858* (2016.01)
*H01M 8/04992* (2016.01)
*H01M 16/00* (2006.01)
*B60L 58/40* (2019.01)

(52) U.S. Cl.
CPC ... *H01M 8/04223* (2013.01); *H01M 8/04365* (2013.01); *H01M 8/04634* (2013.01); *H01M 8/04992* (2013.01); *H01M 16/006* (2013.01); *B60L 2210/10* (2013.01); *B60L 2210/20* (2013.01); *B60L 2240/421* (2013.01); *B60L 2240/423* (2013.01); *H01M 2250/20* (2013.01); *Y02T 90/32* (2013.01)

(56) References Cited

FOREIGN PATENT DOCUMENTS

| | | | | |
|---|---|---|---|---|
| JP | 2008-91319 A | | 4/2008 | |
| JP | 4821187 B2 | | 11/2011 | |
| JP | 2013-140715 | * | 7/2013 | ............. H01M 8/04 |
| JP | 2014-235780 A | | 12/2014 | |
| JP | 2015-35840 A | | 2/2015 | |
| WO | WO 2008/143112 A1 | | 11/2008 | |

* cited by examiner

POWER CONDITIONING SYSTEM AND CONTROL METHOD THEREFOR

TECHNICAL FIELD

The present invention relates to a power conditioning system with a fuel cell, a high-voltage battery and a DC/DC converter and a control method therefor.

BACKGROUND ART

Among power conditioning systems with a fuel cell, a power conditioning system is known which can supply output power of a fuel cell to a load by supplying fuel gas (e.g. hydrogen) and oxidant gas (e.g. air) to the fuel cell according to a request of the load connected to the fuel cell.

In the power conditioning system as described above, to control an operating state of the fuel cell, alternating-current components of an output current and an output voltage of the fuel cell are measured while an alternating-current voltage signal is output, and an internal impedance of the fuel cell is estimated by computing these measured alternating-current components.

JP4821187B discloses a fuel cell system with a battery (high-voltage secondary battery), a fuel cell provided electrically in parallel to the battery, a DC/DC converter provided on an output side of the battery and an inverter provided between this DC/DC converter and a motor serving as a load.

In this fuel cell system (single converter type), to estimate an internal impedance of the fuel cell, an output target voltage of the DC/DC converter superimposed with an impedance measurement signal (alternating-current voltage signal) is output and an amplitude of the impedance measurement signal after passage through the DC/DC converter is measured. By applying a necessary computation process to this measurement result, the internal impedance of the fuel cell is obtained.

The present applicant has proposed a power conditioning system (twin converter type) with a fuel cell, a battery, and DC/DC converters provided on each of output sides of both the fuel cell and the battery.

In this case, unlike the above single converter type, an internal impedance of the fuel cell can be also measured by outputting an impedance measurement signal as described above to the DC/DC converter on the fuel cell side.

SUMMARY OF INVENTION

In the power conditioning system of the single converter type as described above, the alternating-current voltage signal is used as the impedance measurement signal of the fuel cell. Normally, an alternating-current voltage signal for a fuel cell is superimposed via a DC/DC converter having a large impedance at a superimposed frequency of this alternating-current voltage signal. Thus, an output voltage of the DC/DC converter may possibly largely fluctuate.

In such a situation, a ripple voltage component generated from the fuel cell increases. If the ripple voltage component increases, there is a problem that each electrical component constituting the power conditioning system may malfunction.

Further, since the alternating-current voltage signal is superimposed by a switching operation of a switching element (semiconductor element) constituting the DC/DC converter, a current flows into a reactor and the switching element in the DC/DC converter. In this case, since loss such as copper loss occurs in each element, there is a problem that power efficiency decreases and each element generates heat.

On the other hand, in the power conditioning system of the twin converter type as described above, the impedance measurement signal can be generated using either one of the DC/DC converters. However, in the case of using the DC/DC converter for the battery to generate the impedance measurement signal, problems similar to those of the above single converter type occur.

Further, in the case of using the DC/DC converter for the fuel cell to generate the impedance measurement signal, there is a problem of reducing the power generation efficiency of the fuel cell in addition to a problem that each element generates heat as described above.

Particularly, in the case of installing such a power conditioning system in a vehicle, there is also a problem that the fuel of the fuel cell, i.e. hydrogen, is wastefully consumed and fuel economy of the vehicle decreases.

The present invention was made, focusing on the problems described above and aims to provide a power conditioning system capable of reducing heat generation of a DC/DC converter for applying an alternating-current voltage signal to measure an impedance of a fuel cell and a control method therefor.

According to one aspect of the present invention, a power conditioning system includes a fuel cell connected to a load, a fuel cell converter connected between the fuel cell and the load and converting an output voltage of the fuel cell at a predetermined required voltage ratio, a battery connected to the load in parallel to the fuel cell and serving as a power supply source different from the fuel cell, and a battery converter connected between the battery and the load and converting an output voltage of the battery at a predetermined required voltage ratio. The power conditioning system includes a current bypass path configured to couple the fuel cell and the load while bypassing the fuel cell converter, an alternating-current voltage application unit configured to apply an alternating-current voltage signal to an output side of the fuel cell converter, and an internal state estimation unit configured to estimate an internal state of the fuel cell on the basis of a predetermined physical quantity when the alternating-current voltage signal was applied by the alternating-current voltage application unit.

DESCRIPTION OF EMBODIMENTS

Hereinafter, embodiments of the present invention are described with reference to the accompanying drawings.

First Embodiment

Figure 1:
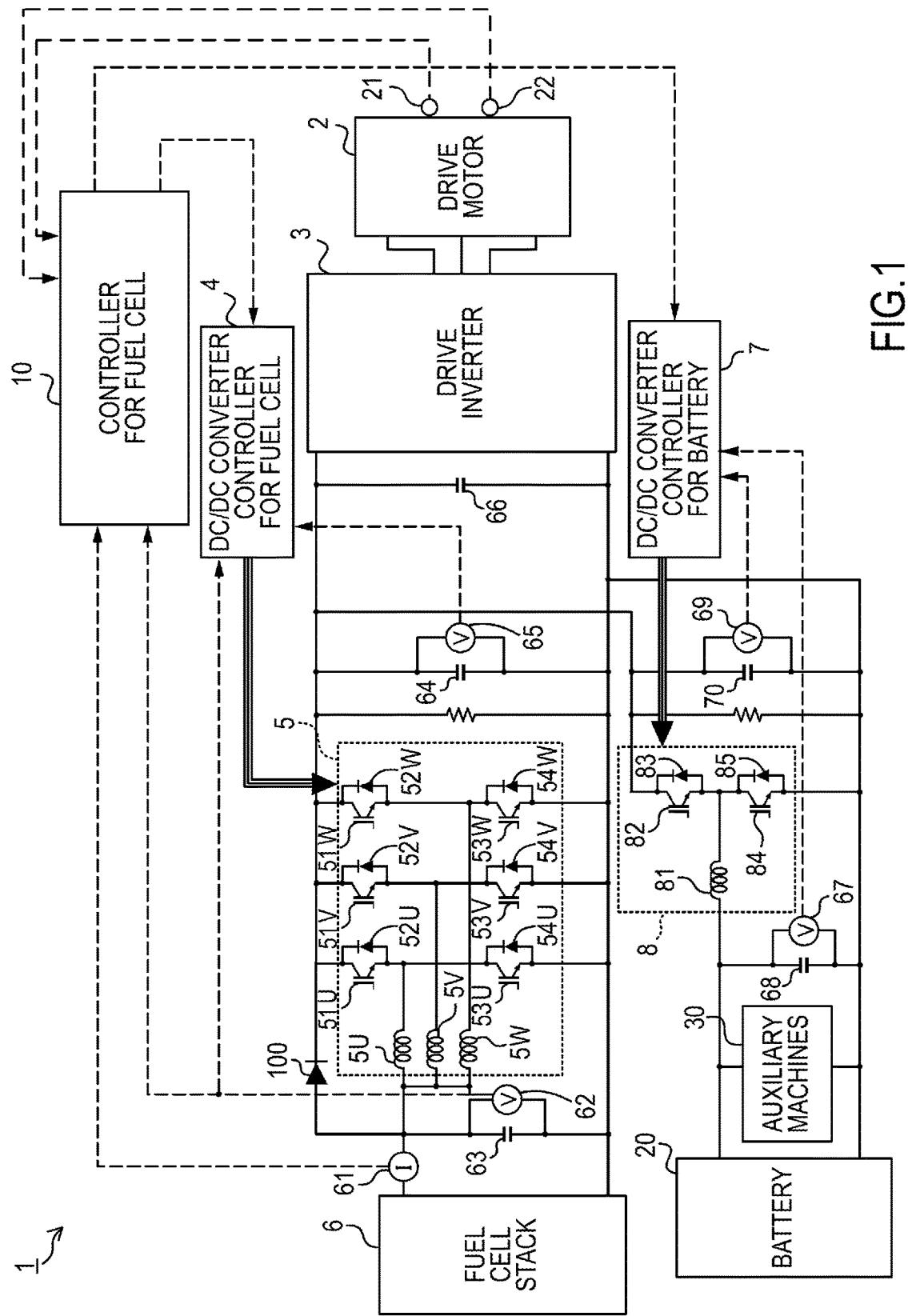
FIG. 1 is a diagram showing an overall configuration of a power conditioning system for fuel cell in a first embodiment of the present invention.

FIG. 1 is a diagram showing an overall configuration of a power conditioning system for fuel cell 1 (hereinafter, merely referred to as the "power conditioning system 1") in a first embodiment of the present invention. The power conditioning system 1 of the present invention includes a high-energy battery and is used in a vehicle using a fuel cell as a drive source. This power conditioning system 1 is, for example, installed in an electric vehicle configured to be driven by a drive motor 2 as shown in FIG. 1. It should be noted that this power conditioning system 1 can be also applied to loads such as devices other than fuel cell vehicles (electric vehicles utilizing a fuel cell) if a fuel cell is used as a drive source.

The power conditioning system 1 of the present embodiment includes, as shown in FIG. 1, a fuel cell stack 6, a DC/DC converter 5 for the fuel cell stack 6 (fuel cell converter), a high-energy battery 20 (hereinafter, merely referred to as the "battery 20"), auxiliary machines 30, and a DC/DC converter 8 for the battery 20 (battery converter). Further, the power conditioning system 1 includes a controller for fuel cell 10 for controlling the entire power conditioning system 1 including the fuel cell stack 6, a DC/DC converter controller for fuel cell 4 for controlling the DC/DC converter 5 and a DC/DC converter controller for battery 7 for controlling the DC/DC converter 8. Furthermore, the power conditioning system 1 includes the drive motor 2 serving as a load and a drive inverter 3 for controlling to switch direct-current power input from the fuel cell stack 6 and the battery 20 to alternating-current power to the drive motor 2.

In the present embodiment, a current bypass path along which an output current of the fuel cell stack 6 bypasses the DC/DC converter 5 is provided between an output terminal on a positive electrode side of the DC/DC converter 5 and an output terminal on a positive electrode side of the fuel cell stack 6. Specifically, this current bypass path couples the fuel cell stack 6 and the drive motor 2 serving as the load via the drive inverter 3.

Further, a diode 100 serving as a current direction cut-off unit configured to cut off the flow of a current from the side of the drive motor 2 serving as the load to the fuel cell stack 6 is provided on the current bypass path. The diode 100 is arranged such that a direction from the fuel cell stack 6 toward the drive inverter 3 is a forward direction and functions as a current direction cut-off unit of the present invention. Thus, if the DC/DC converter 5 for the fuel cell stack 6 is boosting, a current backflow from the output side of the DC/DC converter 5 to the fuel cell stack 6 can be prevented by this diode 100.

The DC/DC converter 5 for the fuel cell stack 6 is provided between the fuel cell stack 6 and the drive inverter 3 (drive motor 2). This DC/DC converter 5 is for converting an output voltage of the fuel cell stack 6 into an input voltage of the drive inverter 3 at a predetermined required voltage ratio. In the present embodiment, the DC/DC converter 5 is a step-up converter for boosting the output voltage of the fuel cell stack 6 to a voltage suitable as a drive voltage of the drive motor 2.

In the present embodiment, the DC/DC converter 5 is constituted by a three-phase converter. Thus, this DC/DC converter 5 is referred to as a multi-phase converter 5 in some cases below. It should be noted that the number of phases of the multi-phase converter 5 may be more than three.

The multi-phase converter 5 is composed of three converters including a U-phase converter, a V-phase converter and a W-phase converter as shown in FIG. 1. Three reactors 5U, 5V and 5W are respectively connected to the U-phase, V-phase and W-phase converters. It should be noted that the U-phase, V-phase and W-phase converters are similarly configured. Thus, the configuration of the U-phase converter is described as a representative below.

The U-phase converter includes the reactor 5U, a switching element 51U on a step-down side, a rectifying diode 52U, a switching element 53U on a step-up side and a reflux diode 54U. The switching element 51U is connected in inverse parallel to the rectifying diode 52U, and the switching element 53U is connected in inverse parallel to the reflux diode 54U. These switching elements 51U, 53U are, for example, constituted by IGBTs (Insulated Gate Bipolar Transistors).

One end of the reactor 5U is connected to the output terminal on the positive electrode side of the fuel cell stack 6 via a current sensor 61, and the other end is connected to one ends of the switching element 51U and the rectifying diode 52U and one ends of the switching elements 53U and the reflux diode 54U. The other ends of the switching element 51U and the rectifying diode 52U are connected to a cathode terminal of the diode 100 and an input terminal on a positive electrode side of the drive inverter 3. Further, the other ends of the switching element 53U and the reflux diode 54U are connected to an output terminal on a negative electrode side of the fuel cell stack 6 and an input terminal on a negative electrode side of the drive inverter 3.

A voltage sensor 62 for detecting an output voltage of the fuel cell stack 6 and a capacitor 63 for smoothing the output voltage of the fuel cell stack 6 are connected in parallel between the output terminals of the fuel cell stack 6. The capacitor 63 is for smoothing the output voltage of the fuel cell stack 6, whereby a ripple component in the output of the fuel cell stack 6 can be reduced.

Further, a capacitor 64 for smoothing an output voltage of the multi-phase converter 5 and a voltage sensor 65 for detecting the output voltage of the multi-phase converter 5 (input voltage of the drive inverter 3) are connected in parallel between the output terminals of the multi-phase converter 5. A ripple component in the output of the multi-phase converter 5 can be reduced by this capacitor 64.

Furthermore, a capacitor 66 for smoothing the input voltage of the drive inverter 3 is provided between a connection terminal between the output terminal of the multi-phase converter 5 and the output terminal of the DC/DC converter 8, and an input terminal of the drive inverter 3.

The fuel cell stack 6 is connected to the drive motor 2 serving as the load of the power conditioning system 1 via the multi-phase converter 5 and the drive inverter 3. The fuel cell stack 6 is a laminated battery for generating power according to an electrical load such as the drive motor 2 by receiving the supply of cathode gas (oxidant gas) and anode gas (fuel gas) from unillustrated cathode gas supplying/discharging device and anode gas supplying/discharging device. For example, several hundreds of fuel cells are laminated in the fuel cell stack 6.

Many devices such as anode gas supply/discharge passages, cathode gas supply/discharge passages, pressure control valves provided in each passage, a cooling water circulation passage and a cooling water pump, a radiator and a cooling device for the fuel cell stack 6 are connected to the fuel cell stack 6. However, since these are less relevant to technical features of the present invention, these are not shown.

The drive motor 2 is for driving the vehicle in which the power conditioning system 1 of the present embodiment is installed. The drive inverter 3 is for converting direct-current power supplied from the fuel cell stack 6 and the battery 20 into alternating-current power and supplying the converted alternating-current power to the drive motor 2. The drive motor 2 is rotationally driven by the alternating-current power supplied by the drive inverter 3 and supplies rotational energy thereof to a subsequent stage. It should be noted that, although not shown, the drive motor 2 is coupled to drive wheels of the vehicle via differentials and shafts.

During downhill travel or deceleration of the vehicle, regenerative power of the drive motor 2 is supplied to the battery 20 via the drive inverter 3 and the DC/DC converter 8 and the battery 20 is charged according to a state of charge of the battery 20. Further, during power travel of the vehicle, the drive motor 2 is rotated by power generated by the fuel cell stack 6 and power accumulated in the battery 20, and rotational energy thereof is transmitted to the unillustrated drive wheels of the vehicle.

A motor rotation speed detection unit 21 configured to detect a motor rotation speed of the drive motor 2 and a motor torque detection unit 22 configured to detect a motor torque of the drive motor 2 are provided near the drive motor 2. The motor rotation speed and motor torque of the drive motor 2 detected by these detection units 21, 22 are output to the controller for fuel cell 10.

The battery 20 is a chargeable/dischargeable secondary battery and, for example, a lithium ion battery of 300 V (volts). The battery 20 is connected to the auxiliary machines 30 and constitutes a power supply for the auxiliary machines 30. Further, the battery 20 is connected to the drive inverter 3 and the DC/DC converter 5 via the DC/DC converter 8. Specifically, the battery 20 is connected to the drive motor 2 serving as the load of the power conditioning system 1 in parallel to the fuel cell stack 6.

A voltage sensor 67 for detecting an output voltage of the battery 20 and a capacitor 68 for smoothing the output voltage of the battery 20 are connected to an output terminal of the battery 20 in parallel to the auxiliary machines 30.

The DC/DC converter 8 for the battery 20 is provided between the battery 20 and the drive inverter 3 (drive motor 2). This DC/DC converter 8 is for converting an output voltage of the battery 20 into an input voltage of the drive inverter 3 at a predetermined required voltage ratio. It should be noted that an output voltage of the DC/DC converter 8 is controlled to be linked (synchronized) with the output voltage of the multi-phase converter 5 as described later.

In the present embodiment, the DC/DC converter 8 is a single-phase converter unlike the multi-phase converter 5 for the fuel cell stack 6. As shown in FIG. 1, this DC/DC converter 8 includes a reactor 81, a switching element 82 on a step-down side, a rectifying diode 83, a switching element 84 on a step-up side and a reflux diode 85. The switching element 82 is connected in inverse parallel to the rectifying diode 83, and the switching element 84 is connected in inverse parallel to the reflux diode 85. These switching elements 82, 84 are, for example, constituted by IGBTs.

One end of the reactor 81 is connected to an output terminal on a positive electrode side of the battery 20 and the other end is connected to one ends of the switching element 82 and the rectifying diode 83 and one ends of the switching element 84 and the reflux diode 85. The other ends of the switching element 82 and the rectifying diode 83 are connected to the input terminal on the positive electrode side of the drive inverter 3. Further, the other ends of the switching element 84 and the reflux diode 85 are connected to an output terminal on a negative electrode side of the battery 20 and the input terminal on the negative electrode side of the drive inverter 3.

A capacitor 70 for smoothing the output voltage of the DC/DC converter 8 and a voltage sensor 69 for detecting the output voltage of the DC/DC converter 8 (input voltage of the drive inverter 3) are connected between the output terminals of the DC/DC converter 8.

The auxiliary machines 30 are mainly components accessory to the fuel cell stack 6 and include the cathode gas supplying/discharging device, the anode gas supplying/discharging device, an unillustrated air compressor, the cooling pump and the like as described above. It should be noted that if various components of the auxiliary machines 30 are pieces of light electrical equipment, an unillustrated step-down DC/DC converter may be provided between the battery 20 and the targeted auxiliary machine 30. Instead of that, an unillustrated light electrical battery for light electrical equipment may be provided.

Although not shown, the controller for fuel cell 10 is constituted by a microcomputer with a central processing unit (CPU), a read-only memory (ROM), a random access memory (RAM) and an input/output interface (I/O interface). An output current value and an output voltage value of the fuel cell stack 6 detected by the current sensor 61 and the voltage sensor 62 are input to the controller for fuel cell 10.

Further, the controller for fuel cell 10 outputs commands for operating the multi-phase converter 5 and the DC/DC converter 8 to the DC/DC converter controller for fuel cell 4 and the DC/DC converter controller for battery 7 on the basis of the output current value and output voltage value of the fuel cell stack 6 input from the respective sensors 61, 62 and the motor rotation speed and motor torque of the drive motor 2 input from the respective detection unit 21, 22.

The DC/DC converter controller for fuel cell 4 is for controlling the multi-phase converter 5 on the basis of a command from the controller for fuel cell 10. The DC/DC converter controller for fuel cell 4 ON/OFF controls the switching elements 51U to 51W, 53U to 53W of the respective phases of the multi-phase converter 5 on the basis of a command (FC voltage command) from the controller for fuel cell 10 in the present embodiment.

Specifically, the output voltage value of the fuel cell stack 6 detected by the voltage sensor 62 and the output voltage value of the multi-phase converter 5 detected by the voltage sensor 65 are input to the DC/DC converter controller for fuel cell 4. The DC/DC converter controller for fuel cell 4 controls to switch each switching element 51U to 51W, 53U to 53W of the multi-phase converter 5 so that a voltage ratio (output voltage/input voltage) of the multi-phase converter 5 reaches a command value (FC voltage command value) from the controller for fuel cell 10.

The DC/DC converter controller for battery 7 is for controlling the DC/DC converter 8 for the battery 20 on the basis of a command from the controller for fuel cell 10. The DC/DC converter controller for the fuel cell 4 and the DC/DC converter controller for battery 7 respectively control the voltage ratio by the multi-phase converter 5 and the voltage ratio by the DC/DC converter 8 so that the input voltages to the drive inverter 3 are the same voltage (DC link voltage).

The output voltage value of the battery 20 detected by the voltage sensor 67 and the output voltage value of the DC/DC converter 8 detected by the voltage sensor 69 are input to the DC/DC converter controller for battery 7. The DC/DC converter controller for battery 7 controls to switch each switching element 82, 84 of the DC/DC converter 8 so that a voltage ratio (output voltage/input voltage) of the DC/DC converter 8 reaches a command value (DC link voltage command value) from the controller for fuel cell 10.

Figure 2:
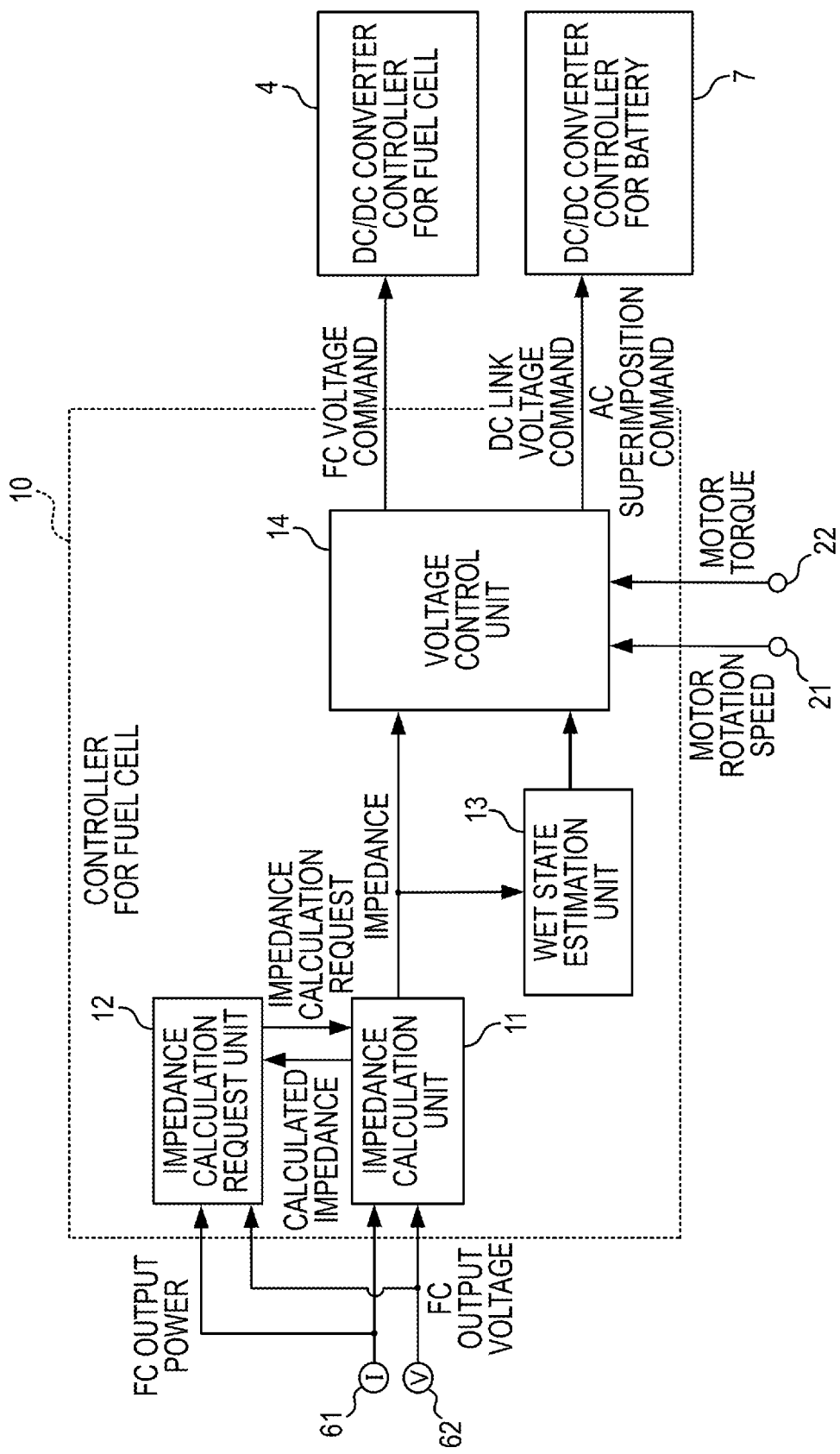
FIG. 2 is a block diagram showing a functional configuration of a controller for fuel cell of FIG. 1.

FIG. 2 is a block diagram showing a functional configuration of the controller for fuel cell 10 shown in FIG. 1. As shown in FIG. 2, the controller for fuel cell 10 of the present embodiment includes an impedance calculation unit 11, an impedance calculation request unit 12, a wet state estimation unit 13 and a voltage control unit 14.

The impedance calculation unit 11 calculates an impedance (internal impedance) of the fuel cell stack 6 on the basis of an alternating-current component of the output current of the fuel cell stack 6 detected by the current sensor 61 and an alternating-current component of the output voltage detected by the voltage sensor 62 when receiving an impedance calculation request of the fuel cell stack 6 requested from the impedance calculation request unit 12.

Here, the calculated impedance of the fuel cell stack 6 is correlated with a degree of wetness of the fuel cell stack 6 when the output current and output voltage of the fuel cell stack 6 were detected. Specifically, as the impedance of the fuel cell stack 6 increases, the fuel cell stack 6 approaches an excessively dry state. On the other hand, as the impedance of the fuel cell stack 6 decreases, the fuel cell stack 6 approaches an excessively wet state.

The impedance calculation request unit 12 determines whether or not the impedance of the fuel cell stack 6 can be detected on the basis of the alternating-current component of the output current of the fuel cell stack 6 detected by the current sensor 61, the alternating-current component of the output voltage detected by the voltage sensor 62 and the last impedance value calculated last time by the impedance calculation unit 11.

Specifically, the impedance calculation request unit 12 determines whether or not a detection value (calculation value of the impedance calculation unit 11) of an impedance detector (impedance detection circuit) is in a saturated state on the basis of the detected output current value and output voltage value of the fuel cell stack 6 and the last impedance value. If the detection value is in the saturated state and it is determined that the impedance of the fuel cell stack 6 cannot be detected, the impedance calculation request unit 12 outputs a command to calculate the impedance of the fuel cell stack 6 again, i.e. an impedance calculation request to the impedance calculation unit 11.

Further, the impedance calculation request unit 12 determines whether or not the power generation efficiency of the fuel cell stack 6 has decreased, i.e. whether or not the fuel cell stack 6 is in a state of poor power generation on the basis of an estimated value of the wet state of the fuel cell stack 6 estimated by the wet state estimation unit 13. If it is determined that the power generation efficiency of the fuel cell stack 6 has decreased, the impedance calculation request unit 12 outputs an impedance calculation request of the fuel cell stack 6 to the impedance calculation unit 11.

It should be noted that the controller for fuel cell 10 may be configured to constantly calculate the impedance of the fuel cell stack 6 by the impedance calculation unit 11 by omitting the impedance calculation request unit 12.

The wet state estimation unit 13 estimates the wet state of the fuel cell stack 6 on the basis of the impedance of the fuel cell stack 6 calculated by the impedance calculation unit 11. The wet state of the fuel cell stack 6 estimated in this way is used to control the operation of the fuel cell stack 6. It should be noted that the operation of the fuel cell stack 6 may be controlled by a known control method according to a state of that operation. Thus, in this specification, a control method for the fuel cell stack 6 is not described in detail.

The estimated wet state of the fuel cell stack 6 is output to the voltage control unit 14 for a step-up control of the output voltage of the fuel cell stack 6 and a DC link control (control to link (synchronize) the output voltage of the DC/DC converter 5 and that of the DC/DC converter 8) of the output voltage of the battery 20.

Further, in an operating state of the fuel cell stack 6 in which the impedance of the fuel cell stack 6 is not calculated, the wet state estimation unit 13 estimates the wet state of the fuel cell stack 6 on the basis of a past impedance calculation value and the operating state of the fuel cell stack 6. In this case, an example of the past impedance calculation value is an impedance calculated by the impedance calculation unit 11 when the impedance calculation request was output from the impedance calculation request unit 12 last time. This last impedance value may be stored in an unillustrated memory.

It should be noted that, in the present embodiment, the impedance calculation unit 11 and the wet state estimation unit 13 are collectively referred to as an internal state estimation unit. In the present embodiment, the internal state estimation unit estimates an internal state of the fuel cell stack 6 on the basis of predetermined physical quantities detected when an alternating-current voltage signal was output in a superimposed manner by the DC/DC converter controller for battery 7 according to an AC superimposition command from the voltage control unit 14 to be described later. The predetermined physical quantities include at least the output current and output voltage of the fuel cell stack 6 detected by the current sensor 61 and the voltage sensor 62. A detailed impedance computation method is described later.

The motor rotation speed and motor torque of the drive motor 2 detected by the motor rotation speed detection unit 21 and the motor torque detection unit 22 are input to the voltage control unit 14. The voltage control unit 14 computes an FC voltage command value indicating a driving state of the fuel cell stack 6 and a DC link voltage command value for linking a voltage on an output side of the DC/DC converter 8 for the battery 20 with a voltage on an output side of the multi-phase converter 5 on the basis of various pieces of data of the drive motor 2, the internal impedance of the fuel cell stack 6 calculated by the impedance calculation unit 11, the wet state of the fuel cell stack 6 estimated by the wet state estimation unit 13 and the like.

Then, the voltage control unit 14 outputs the computed FC voltage command value to the DC/DC converter controller for fuel cell 4 and outputs the computed DC link voltage command value to the DC/DC converter controller for battery 7.

Specifically, the voltage control unit 14 determines at which of a motor lower limit voltage of the drive motor 2 and the output voltage of the fuel cell stack 6 (i.e. output voltage of the multi-phase converter 5) the DC link voltage command value should be set on the basis of the motor lower limit voltage of the drive motor 2 and the output voltage of the fuel cell stack 6. Then, on the basis of the DC link voltage command value, the DC/DC converter controller for fuel cell 4 sets the voltage ratio of the multi-phase converter 5 and the DC/DC converter controller for battery 7 sets the voltage ratio of the DC/DC converter 8 for the battery 20.

Further, the voltage control unit 14 calculates a supply voltage of the drive inverter 3, at which the drive motor 2 can be operated, on the basis of the motor rotation speed and motor torque of the drive motor 2 detected by the motor rotation speed detection unit 21 and the motor torque detection unit 22.

Furthermore, the voltage control unit 14 outputs an AC superimposition command to the DC/DC converter controller for battery 7 when the impedance calculation request is output by an impedance calculation request unit 12. Specifically, the voltage control unit 14 constitutes an alternating-current voltage application unit of the present invention together with the DC/DC converter controller for battery 7 and the DC/DC converter 8.

In this way, the DC/DC converter controller for battery 7 superimposes an alternating-current voltage signal on the DC link voltage command value, which is a feedback control value of the DC link voltage. In this specification, the alternating-current voltage signal to be superimposed is, for example, a sine wave signal having a frequency of 1 kHz and an amplitude of 0.5 V.

The internal impedance of the fuel cell stack 6 is calculated by outputting the AC superimposition command in this way because the wet state of the fuel cell stack 6 and electrolyte membrane resistances of the fuel cells constituting the fuel cell stack 6 are highly correlated.

In the present embodiment, each switching element 82, 84 of the DC/DC converter 8 is switching-operated to generate the alternating-current voltage signal, which is a sine wave signal. It should be noted that the alternating-current voltage signal is not limited to the sine wave signal and may be a rectangular wave signal, a triangular wave signal, a sawtooth wave signal or the like.

A specific waveform of the alternating-current voltage signal is described in detail with reference to FIG. 13 when a comparative example of the present invention is described.

Figure 3:
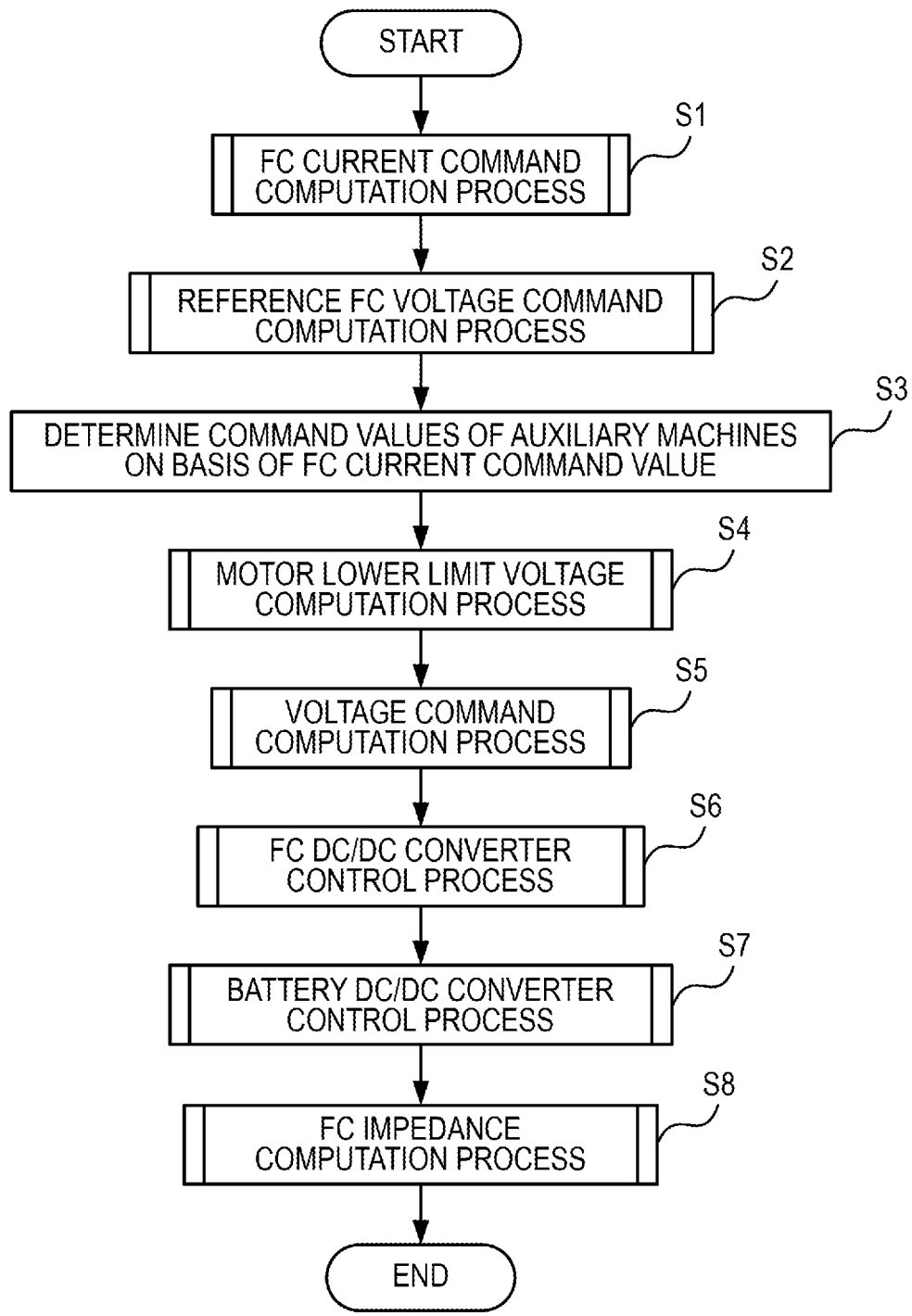
FIG. 3 is a flow chart showing an overall control of the controller for fuel cell, a DC/DC converter controller for fuel cell and a DC/DC converter controller for battery in the first embodiment of the present invention.

Next, an overall operation of the power conditioning system 1 in the present embodiment is described with reference to a flow chart of FIG. 3. It should be noted that the flow chart of FIG. 3 shows an overall operation of the power conditioning system 1 of the present embodiment, but additional step(s) may be included if necessary. Further, a control method for the power conditioning system 1 of the present invention constitutes a part of the overall operation.

FIG. 3 is the flow chart (main process flow) showing an overall control of the controller for fuel cell 10, the DC/DC converter controller for fuel cell 4 and the DC/DC converter controller for battery 7 of the power conditioning system 1 in the first embodiment of the present invention.

A control relating to this flow chart is executed at least at timings at which an operating state of the drive motor 2 and operating states of the auxiliary machines 30 change. However, this control may be executed every predetermined time. Further, a sequence of steps may be changed within a range where no contradiction is caused.

First, the controller for fuel cell 10 performs an FC current command computation process for determining a current command value of the fuel cell stack 6 (Step S1) and performs a reference FC voltage command computation process for determining a voltage command value of the fuel cell stack 6 (Step S2).

Subsequently, the controller for fuel cell 10 determines various operation command values of the auxiliary machines 30 on the basis of the current command value (FC current command value to be described later) and voltage command value of the fuel cell stack 6 determined in Steps S1 and S2 (Step S3) and outputs the determined command values to each auxiliary machine.

Subsequently, the controller for fuel cell 10 performs a motor lower limit voltage computation process for determining a motor lower limit voltage of the drive motor 2 serving as an input voltage of the drive inverter 3 (Step S4).

Subsequently, the controller for fuel cell 10 outputs a superimposition ON-signal for generating an alternating-current voltage signal for impedance measurement and performs a voltage command computation process for determining an FC voltage command value and a DC link voltage command value to be respectively output to the DC/DC converter controller for fuel cell 4 and DC/DC converter controller for battery 7 (Step S5).

Then, the controller for fuel cell 10 outputs a superimposition ON-command to the DC/DC converter controller for battery 7 (see FIG. 2). Further, the controller for fuel cell 10 outputs the FC voltage command and the DC link voltage command determined in this way respectively to the DC/DC converter controller for fuel cell 4 and the DC/DC converter controller for battery 7 (see FIG. 2). It should be noted that the DC link voltage command may be also output to the DC/DC converter controller for fuel cell 4 if necessary.

Subsequently, the DC/DC converter controller for fuel cell 4 performs an FC DC/DC converter computation process for increasing and decreasing the voltage of the multi-phase converter 5 based on the output voltage (FC output voltage) of the fuel cell stack 6 and the DC link voltage command (Step S6).

Subsequently, the DC/DC converter controller for battery 7 performs a battery DC/DC converter control process for increasing and decreasing the voltage of the DC/DC converter 8 on the basis of the DC link voltage command input from the controller for fuel cell 10 (Step S7).

Subsequently, the controller for fuel cell 10 performs an FC impedance computation process for computing (calculating) an internal impedance of the fuel cell stack 6 (Step S8).

Then, the controller for fuel cell 10, the DC/DC converter controller for fuel cell 4 and the DC/DC converter controller for battery 7 finish the overall control flow in the present embodiment shown in FIG. 3.

Next, each subroutine of FIG. 3 is described with reference to a flow chart.

Figure 4:
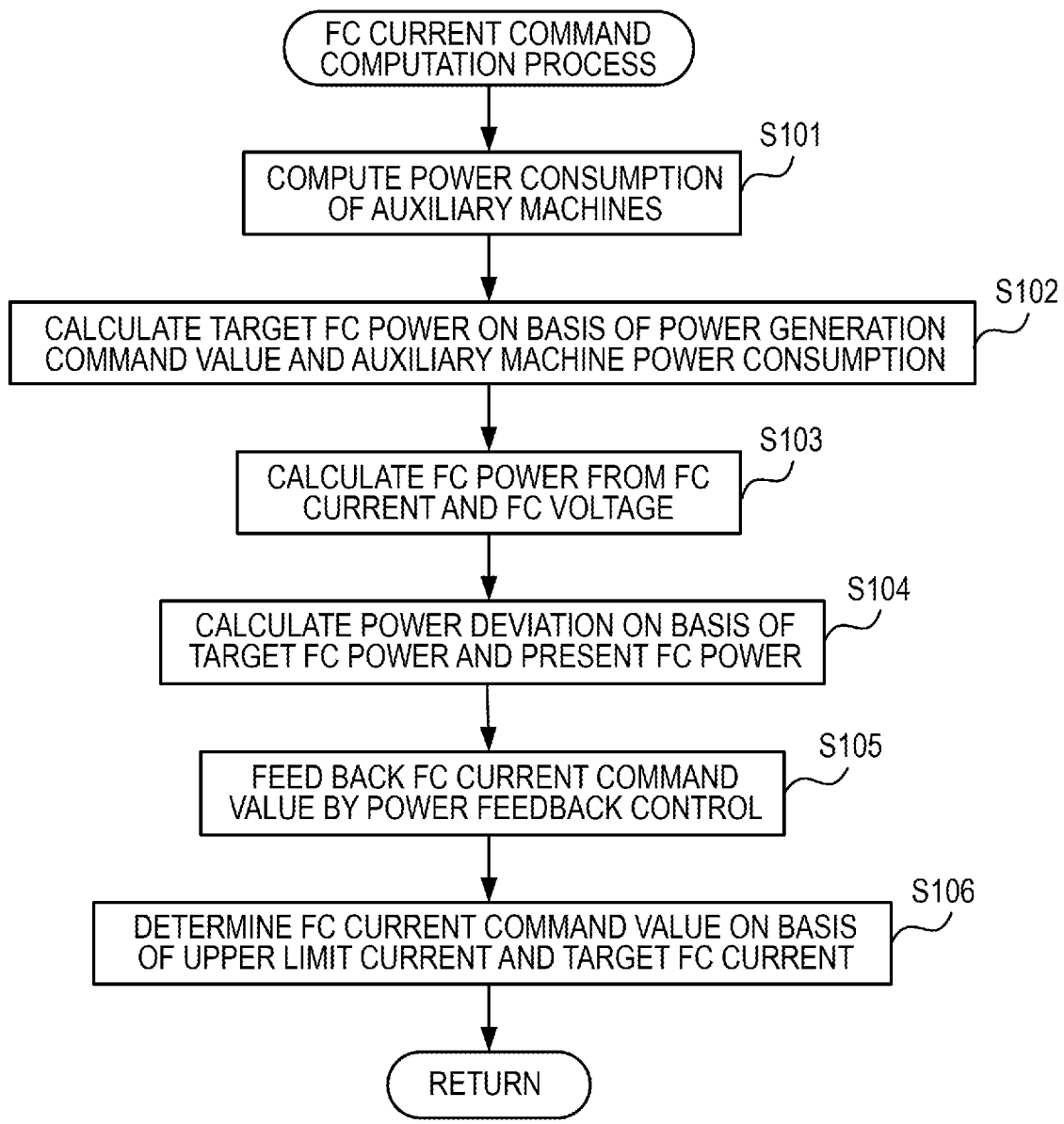
FIG. 4 is a flow chart showing an FC current command computation process performed by the controller for fuel cell.

FIG. 4 is a flow chart showing the FC current command computation process that is a subroutine corresponding to Step S1 of FIG. 3 and performed by the controller for fuel cell 10.

In this FC current command computation process, the controller for fuel cell 10 first computes power to be consumed in each auxiliary machine 30 (Step S101). Then, the controller for fuel cell 10 calculates target fuel cell power on the basis of power generation command values to the battery 20 and the fuel cell stack 6 and the power consumption of the auxiliary machines 30 computed in Step S101 (Step S102).

It should be noted that the power generation command value to the fuel cell stack 6 indicates how much power needs to be generated by the fuel cell stack 6. The controller for fuel cell 10 determines this power generation command value on the basis of a depressed amount of an accelerator pedal by a driver in the vehicle of the present embodiment, i.e. an accelerator pedal opening, a driving state of the drive motor 2 and the like.

Subsequently, the controller for fuel cell 10 calculates the present output power of the fuel cell stack 6 on the basis of the output current value of the fuel cell stack 6 detected by the current sensor 61 and the output voltage value of the fuel cell stack 6 detected by the voltage sensor 62 (Step S103). It should be noted that this output power of the fuel cell stack 6 is obtained by multiplying the output current value and output voltage value of the fuel cell stack 6.

Subsequently, the controller for fuel cell 10 calculates a power deviation of the fuel cell stack 6 on the basis of the target fuel cell power of the fuel cell stack 6 calculated in Step S102 and the actual output power of the fuel cell stack 6 calculated in Step S103 (Step S104). This power deviation is obtained on the basis of a difference between the target fuel cell power and the actual output power.

Subsequently, the controller for fuel cell 10 executes a power feedback control based on a PI control on the basis of the power deviation of the fuel cell stack 6 calculated in Step S104. The controller for fuel cell 10 corrects the current command value (target fuel cell current value) of the fuel cell stack 6 by this power feedback control (Step S105).

Subsequently, the controller for fuel cell 10 determines an FC current command value, which is a current command value to the fuel cell stack 6, on the basis of an upper limit current value of the fuel cell stack 6 set in advance in the controller for fuel cell 10 and the target fuel cell current value obtained in Step S105 (Step S106).

Specifically, the controller for fuel cell 10 compares the upper limit current value of the fuel cell stack 6 and the target fuel cell current command value and determines the smaller one as the FC current command value. Then, the controller for fuel cell 10 finishes this FC current command computation process and returns to the main process flow after determining the FC current command value.

It should be noted that the upper limit current value of the fuel cell stack 6 means an upper limit value of the current value that can be output by the fuel cell stack 6, and obtained in advance through an experiment or the like if necessary.

The controller for fuel cell 10 controls flow rates, pressures and the like of the anode gas and the cathode gas on the basis of the FC current command value determined in Step S106 so that the output current of the fuel cell stack 6 reaches this FC current command value. This is because the flow rates and the like of the anode gas and the cathode gas are controlled to control the output of the fuel cell stack 6, but the flow rates and the like of these gases are controlled on the basis of the output current of the fuel cell stack 6.

Figure 5:
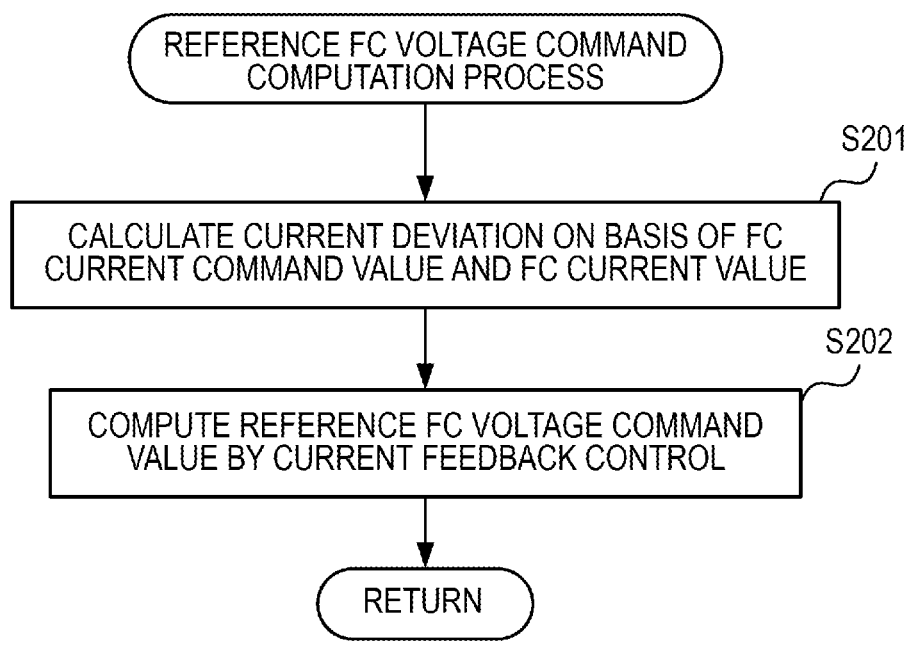
FIG. 5 is a flow chart showing a reference FC voltage command computation process performed by the controller for fuel cell.

FIG. 5 is a flow chart showing the reference FC voltage command computation process that is a subroutine corresponding to Step S2 of FIG. 3 and performed by the controller for fuel cell 10.

In this reference FC voltage command computation process, the controller for fuel cell 10 calculates a current deviation on the basis of the FC current command value determined in Step S106 of the FC current command computation process and the output current value of the fuel cell stack 6 detected by the current sensor 61 (Step S201). This current deviation is obtained based on a difference between the FC current command value of the fuel cell stack 6 and an actual current command value.

Subsequently, the controller for fuel cell 10 executes a current feedback control based on the PI control on the basis of the current deviation calculated in Step S201. As the output current of the fuel cell stack 6 is changed by this current feedback control, the controller for fuel cell 10 computes a reference FC voltage command value serving as a target voltage value of the fuel cell stack 6 on the basis of an IV characteristic curve stored in advance in the unillustrated memory (Step S202). Then, the controller for fuel cell 10 finishes this reference FC voltage command computation process and returns to the main process flow.

It should be noted that the controller for fuel cell 10 may be configured to control the flow rates and pressures of the anode gas and the cathode gas, and the like on the basis of the reference FC voltage command value determined in Step S202 so that the output voltage value of the fuel cell stack 6 reaches this reference FC voltage command value instead of controlling such that the output current of the fuel cell stack 6 reaches the FC current command value.

Figure 6:
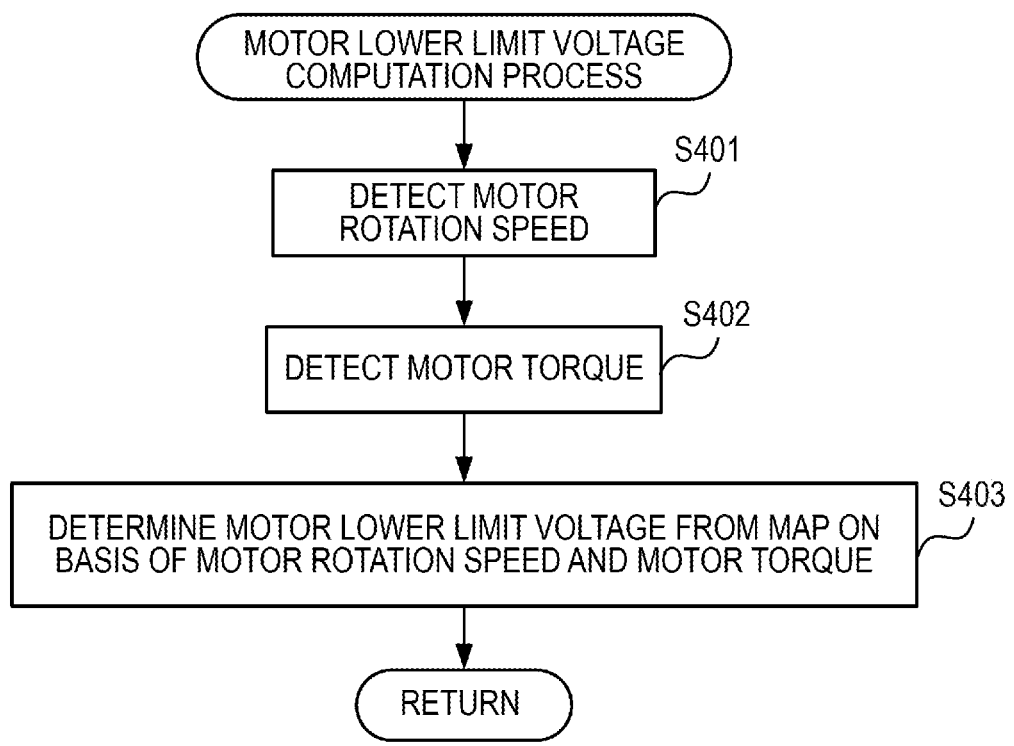
FIG. 6 is a flow chart showing a motor lower limit voltage computation process performed by the controller for fuel cell.

FIG. 6 is a flow chart showing the motor lower limit voltage computation process that is a subroutine corresponding to Step S4 of FIG. 3 and performed by the controller for fuel cell 10.

In this motor lower limit voltage computation process, the controller for fuel cell 10 first detects the motor rotation speed of the drive motor 2 by the motor rotation speed detection unit 21 (Step S401) and detects the motor torque of the drive motor 2 by the motor torque detection unit 22 (Step S402).

It should be noted that an induced voltage is generated in the drive motor 2 as the motor rotation speed of the drive motor 2 increases. Thus, if the supply voltage to the drive motor 2, i.e. the output voltage of the drive inverter 3, is higher than the induced voltage, the drive motor 2 cannot be driven. Thus, in this motor lower limit voltage computation process, the motor rotation speed of the drive motor 2 is first detected.

Further, although not shown, a current sensor for detecting a supply current actually input to the drive motor 2 is provided to detect the motor torque of the drive motor 2 and the efficiency thereof. The controller for fuel cell 10 may detect the motor torque of the drive motor 2 on the basis of the detected supply current value.

Subsequently, the controller for fuel cell 10 refers to a motor rotation speed-motor torque map stored in advance in the unillustrated memory of the controller for fuel cell 10 and determines a motor lower limit voltage on the basis of the motor rotation speed and motor torque of the drive motor 2 detected in Steps S401, S402 (Step S403).

It should be noted that although the motor rotation speed-motor torque map is not shown, map data may be, for example, obtained in advance from experimental data and stored in the memory of the controller for fuel cell 10.

Then, the controller for fuel cell 10 finishes this motor lower limit voltage computation process and returns to the main process flow after determining the motor lower limit voltage in this way.

Figure 7:
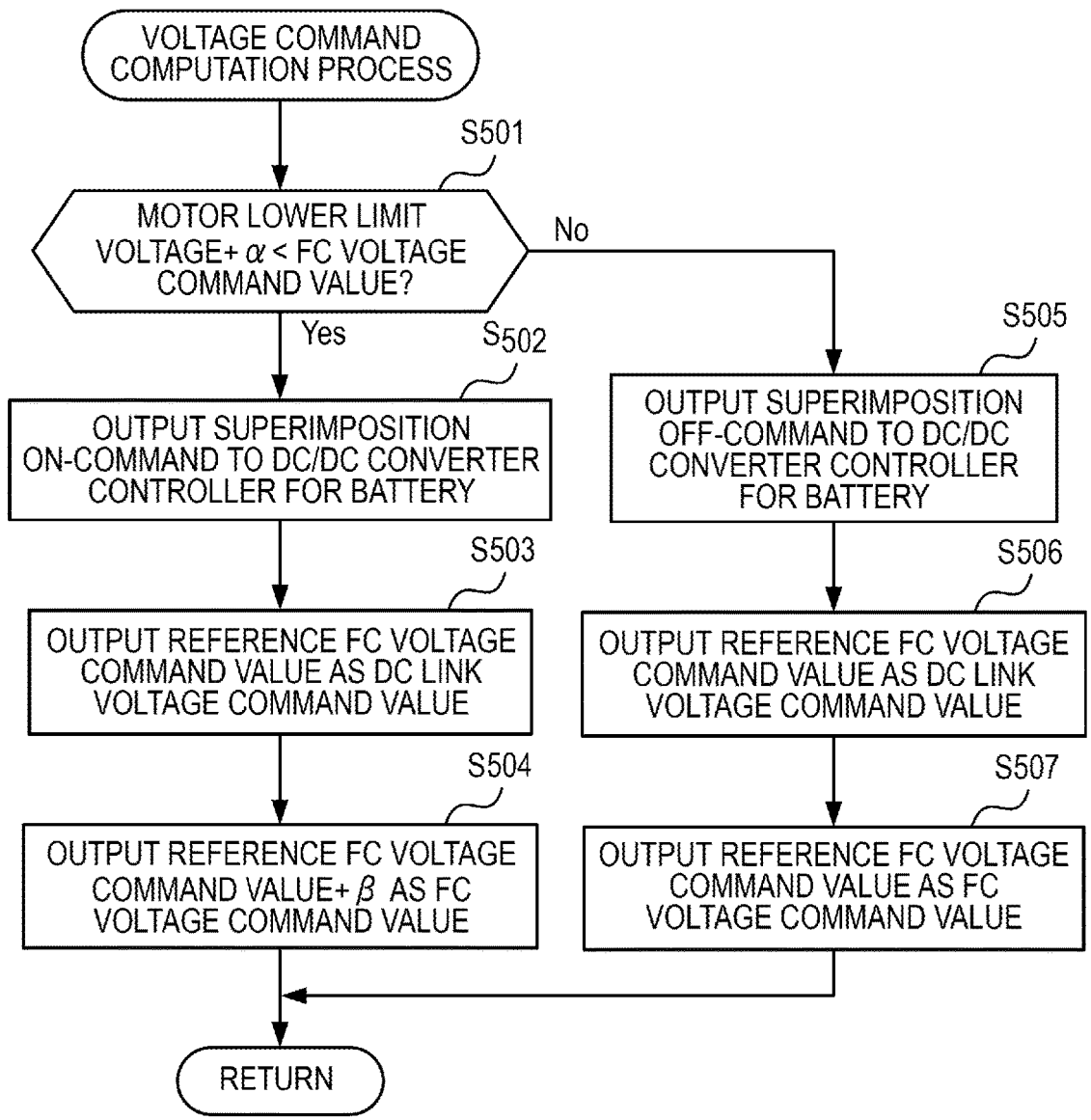
FIG. 7 is a flow chart showing a voltage command computation process performed by the controller for fuel cell.

FIG. 7 is a flow chart showing the voltage command computation process that is a subroutine corresponding to Step S5 of FIG. 3 and performed by the controller for fuel cell 10.

In this voltage command computation process, the controller for fuel cell 10 compares the motor lower limit voltage of the drive motor 2 determined by the motor lower limit voltage computation process and the FC voltage command value computed by the reference FC voltage command computation process. Then, the controller for fuel cell 10 determines whether or not the FC voltage command value is larger than a value obtained by adding a predetermined margin α to the motor lower limit voltage (Step S501).

If the FC voltage command value is determined to be larger than the motor lower limit voltage+α, the controller for fuel cell 10 outputs a superimposition ON-command (i.e. AC superimposition command) to the DC/DC converter controller for battery 7 (Step S502).

Further, the controller for fuel cell 10 outputs the reference FC voltage command value computed in Step S202 of the reference FC voltage command computation process as the DC link voltage command value to the DC/DC converter controller for battery 7 (Step S503).

Subsequently, the controller for fuel cell 10 outputs a value obtained by adding a predetermined margin β to the reference FC voltage command value as the FC voltage command value to the DC/DC converter controller for fuel cell 4 (Step S504). Then, the controller for fuel cell 10 finishes this voltage command computation process and returns to the main process flow.

On the other hand, if the FC voltage command value is determined not to be larger than the motor lower limit voltage+α, the controller for fuel cell 10 outputs a superimposition OFF-command to the DC/DC converter controller for battery 7 (Step S505). In this way, the DC/DC converter controller for battery 7 having caused the DC/DC converter 8 to superimpose the alternating-current voltage signal finishes the superimposition of the alternating-current voltage signal.

Further, the controller for fuel cell 10 outputs the reference FC voltage command value computed in Step S202 of the reference FC voltage command computation process as the DC link voltage command value to the DC/DC converter controller for battery 7 (Step S506).

Subsequently, the controller for fuel cell 10 outputs the reference FC voltage command value as the FC voltage command value to the DC/DC converter controller for fuel cell 4 (Step S507). Then, the controller for fuel cell 10 finishes this voltage command computation process and returns to the main process flow.

Here, each margin α, β is briefly described. The margin α in the determination of Step S501 means a margin for the motor lower limit voltage computed in Step S403 of the motor lower limit voltage computation process.

This margin α is for preventing (motor lower limit voltage)>(DC link voltage) also at a lower limit value of the waveform of the alternating-current voltage signal by superimposing the alternating-current voltage signal generated by the DC/DC converter 8 on the input voltage of the drive inverter 3. Specifically, this margin α is determined through an experiment or the like in consideration of a detection error of the DC link voltage, an amplitude of the alternating-current voltage to be superimposed by the DC/DC converter 8, amplitudes of ripple voltage components generated by the switching operation of each switching element 82, 84 of the DC/DC converter 8 and the like. By considering positive components and negative components of these detection error and voltage amplitudes and adding these values doubled if necessary, the margin α may be determined.

It should be noted that the motor lower limit voltage is set by adding an induced voltage generated by the rotation of the drive motor 2 so as to satisfy a torque request of the drive motor 2.

The margin β in Step S504 means a margin for the DC link voltage command value output by the controller for fuel cell 10 in Step S503. This margin β is for preventing (DC link voltage)>(output voltage of the fuel cell stack 6) also at an upper limit value of the waveform of the alternating-current voltage signal by superimposing the alternating-current voltage signal generated by the DC/DC converter 8 on the input voltage of the drive inverter 3.

The reason for this is that if the DC link voltage is higher than the output voltage of the fuel cell stack 6, a reverse-direction bias is applied to the diode 100 and an avalanche breakdown or the like occurs depending on the performance of the diode 100. It should be noted that the diode 100 may not be provided if this condition is constantly satisfied.

Specifically, this margin β is determined through an experiment or the like in consideration of a detection error between the output voltage of the multi-phase converter 5 and the DC link voltage, an amplitude of the alternating-current voltage to be superimposed by the DC/DC converter 8, amplitudes of ripple voltage components generated by the switching operation of each switching element 82, 84 of the DC/DC converter 8, voltage falling due to the flow of the current into the multi-phase converter 5 and the like.

It should be noted that, as is known from the determination of Step S501, this DC link voltage command value is a value higher than the motor lower limit voltage+α.

Figure 8:
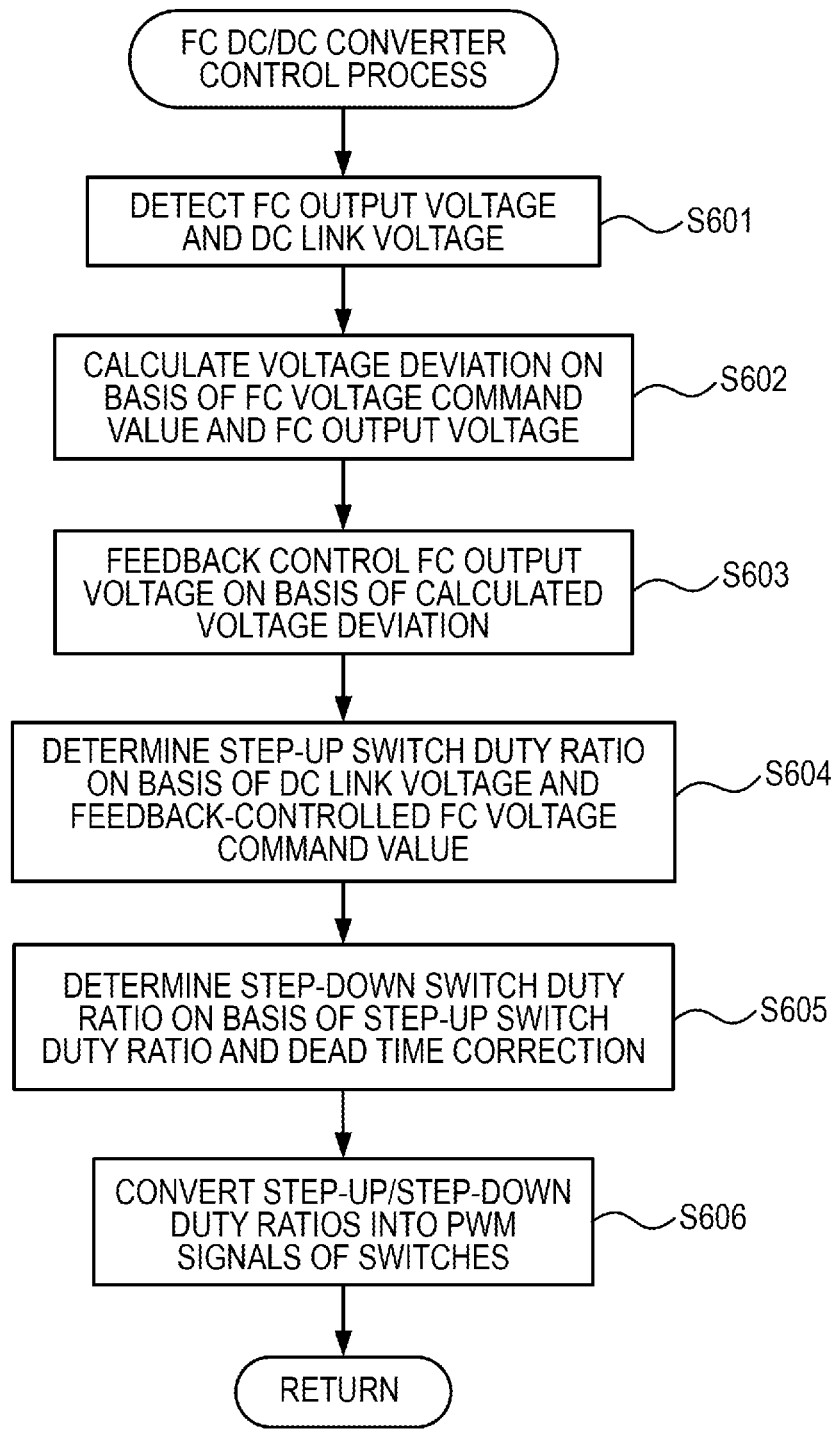
FIG. 8 is a flow chart showing an FC DC/DC converter control process performed by the DC/DC converter controller for fuel cell.

FIG. 8 is a flow chart showing the FC DC/DC converter control process that is a subroutine corresponding to Step S6 of FIG. 3 and performed by the DC/DC converter controller for fuel cell 4.

In this FC DC/DC converter control process, the DC/DC converter controller for fuel cell 4 detects the output voltage of the fuel cell stack 6 and the output voltage of the multi-phase converter 5, i.e. the DC link voltage, by the voltage sensors 62, 65 (Step S601).

Then, the DC/DC converter controller for fuel cell 4 calculates a voltage deviation of the output voltage of the fuel cell stack 6 on the basis of the FC voltage command value input from the controller for fuel cell 10 and the detected output voltage value of the fuel cell stack 6 (Step S602). This voltage deviation is obtained based on a difference between the FC voltage command value and the detected output voltage value of the fuel cell stack 6.

Subsequently, the DC/DC converter controller for fuel cell 4 executes a voltage feedback control based on the PI control for the output voltage of the fuel cell stack 6 (i.e.

input/output voltage ratio of the multi-phase converter 5) on the basis of the voltage deviation of the fuel cell stack 6 calculated in Step S602 (Step S603).

Subsequently, the DC/DC converter controller for fuel cell 4 determines a duty ratio of a step-up switch (lower stage) on the basis of the DC link voltage and the feedback controlled FC voltage command value (Step S604) and determines a duty ratio of a step-down switch (upper stage) on the basis of the duty ratio of the step-up switch (lower stage) determined in this way and a dead time correction (Step S605).

Figure 9:
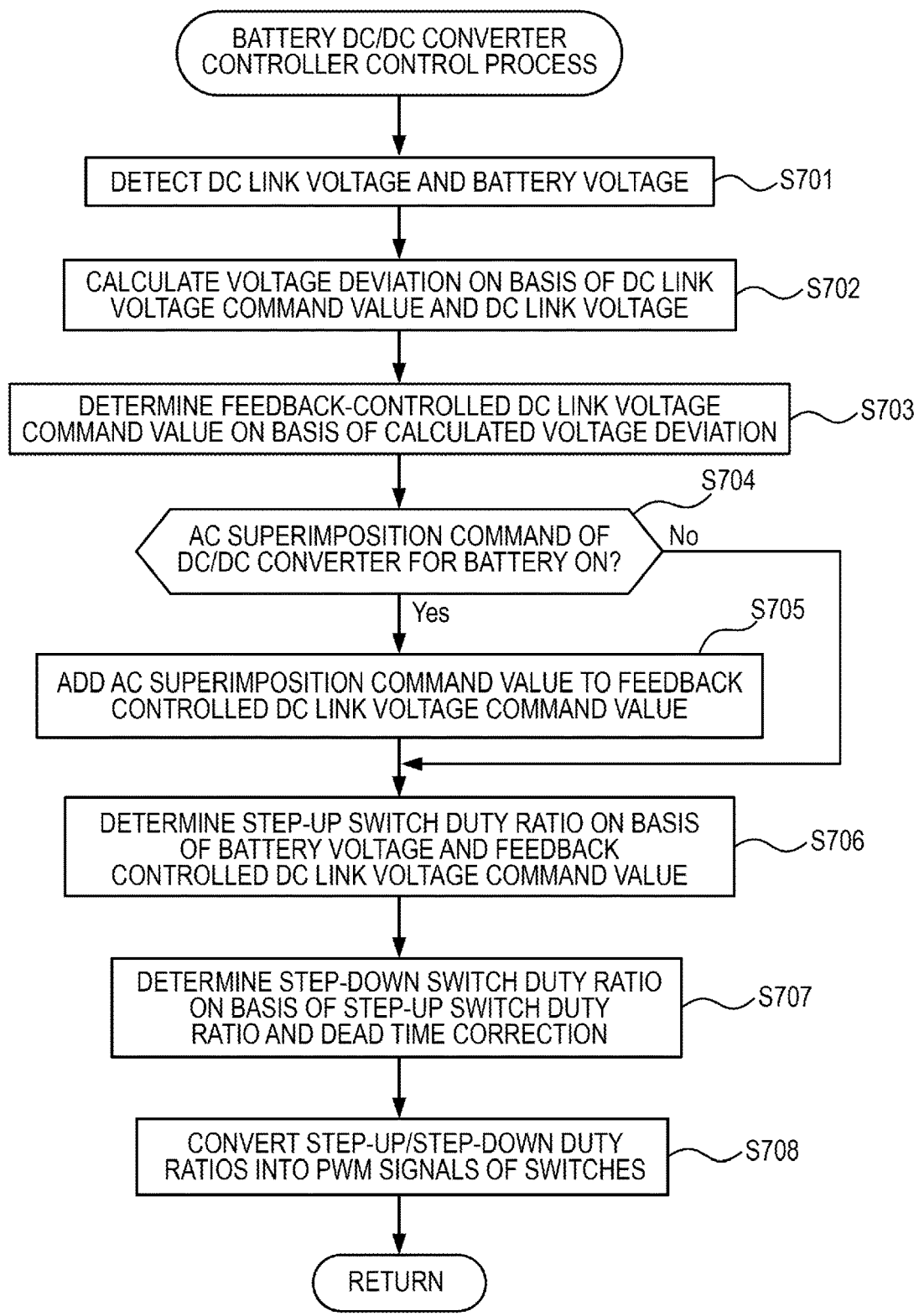
FIG. 9 is a flow chart showing a battery DC/DC converter control process performed by the DC/DC converter controller for battery.

Subsequently, the DC/DC converter controller for fuel cell 4 converts the step-up duty ratio and step-down duty ratio determined in Step S604, S605 into PWM signals to be output to each switching element 51U to 51W, 53U to 53W or generates the PWM signals from the step-up duty ratio and step-down duty ratio (Step S606). Then, the DC/DC converter controller for fuel cell 4 outputs these PWM signals to the corresponding switching elements 51U to 51W, 53U to 53W, finishes this FC DC/DC converter control process and returns to the main process flow, FIG. 9 is a flow chart showing the battery DC/DC converter control process that is a subroutine corresponding to Step S7 of FIG. 3 and performed by the DC/DC converter controller for battery 7.

In this battery DC/DC converter control process, the DC/DC converter controller for battery 7 first detects the output voltage of the DC/DC converter 8, i.e. DC link voltage, and the output voltage of the battery 20 by the voltage sensors 67, 69 (Step S701).

Then, the DC/DC converter controller for battery 7 calculates a voltage deviation of the DC link voltage on the basis of the DC link voltage command value and the detected DC link voltage value (S702). This voltage deviation is obtained based on a difference between the DC link voltage command value and the detected DC link voltage value.

Subsequently, the DC/DC converter controller for battery 7 executes a voltage feedback control based on the PI control for the DC link voltage (i.e. input/output voltage ratio of the DC/DC converter 8) on the basis of the voltage deviation of the DC link voltage calculated in Step S702 (Step S703).

Subsequently, the DC/DC converter controller for battery 7 determines whether or not the AC superimposition command for the DC/DC converter 8 for the battery 20 is ON (Step S704). If the AC superimposition command is determined not to be ON, the DC/DC converter controller for battery 7 transitions to Step S706 without performing a processing of the AC superimposition.

On the other hand, if the AC superimposition command is determined to be ON, the DC/DC converter controller for battery 7 adds the AC superimposition command value for generating an alternating-current voltage signal for internal impedance measurement of the fuel cell stack 6 to the feedback-controlled DC link voltage command value determined in Step S703.

Subsequently, the DC/DC converter controller for battery 7 determines a duty ratio of a step-up switch (lower stage) on the basis of the output voltage of the battery 20 and the feedback-controlled DC link voltage command value (Step S706). Specifically, the duty ratio of the step-up switch (lower stage) is an inverse of a value obtained by subtracting a quotient of the output voltage value of the battery 20 by the feedback-controlled DC link voltage command value from 1.

Subsequently, the DC/DC converter controller for battery 7 determines a duty ratio of a step-down switch (upper stage) on the basis of the duty ratio of the step-up switch (lower stage) determined in this way and a dead time correction (Step S707). Specifically, the duty ratio of the step-down switch (upper stage) is a value obtained by subtracting the duty ratio of the step-up switch (lower stage) determined in Step S706 and a dead time correction value from 1.

Subsequently, the DC/DC converter controller for battery 7 converts the step-up duty ratio and step-down duty ratio determined in Steps S706, S707 into PWM signals to be output to each switching element 82, 84 or generates the PWM signals from the step-up duty ratio and step-down duty ratio (Step S708). Then, the DC/DC converter controller for battery 7 outputs these PWM signals to the corresponding switching elements 82, 84, finishes this battery DC/DC converter control process and returns to the main process flow.

Figure 10:
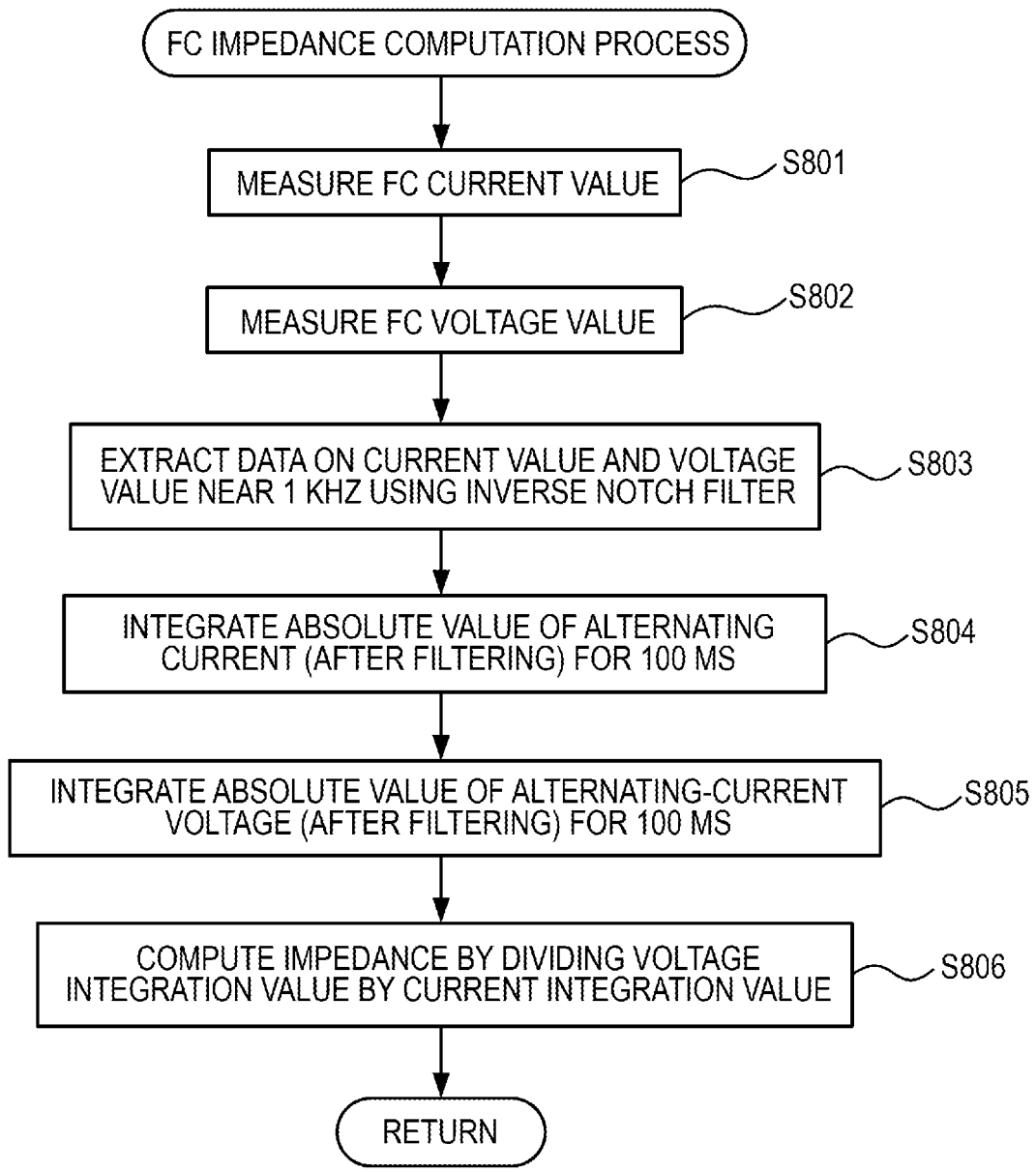
FIG. 10 is a flow chart showing an FC impedance computation process performed by the controller for fuel cell.

FIG. 10 is a flow chart showing the FC impedance computation process that is a subroutine corresponding to Step S8 of FIG. 3 and performed by the controller for fuel cell 10.

In this FC impedance computation process, the controller for fuel cell 10 measures the output current of the fuel cell stack 6 by the current sensor 61 (Step S801) and measures the output voltage of the fuel cell stack 6 by the voltage sensor 62 (Step S802).

Figure 11:
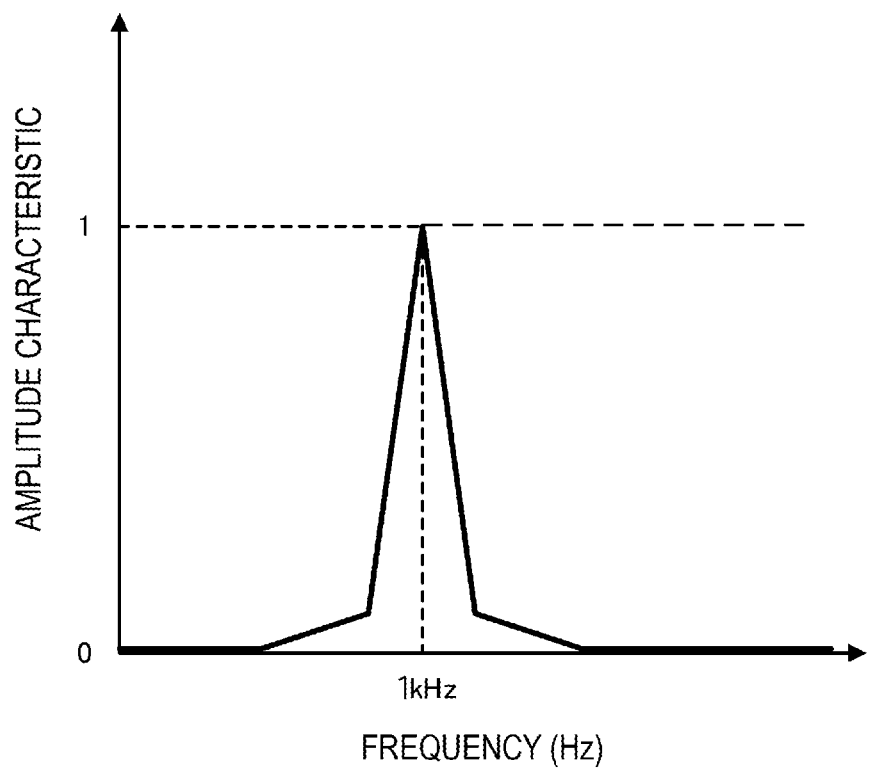
FIG. 11 is a graph showing a frequency-amplitude characteristic of an inverse notch filter used in the FC impedance computation process.

Subsequently, the controller for fuel cell 10 extracts components close to 1 kHz of the output current value and output voltage value measured in Step S801, S802 using an inverse notch filter and calculates an alternating current value and an alternating-current voltage value at 1 kHz (Step S803). It should be noted that the inverse notch filter is a filter having a frequency-amplitude characteristic having a passband center set at 1 kHz as shown in FIG. 11. FIG. 11 is a graph showing the frequency-amplitude characteristic of the inverse notch filter used in the FC impedance computation process.

Subsequently, the controller for fuel cell 10 integrates an absolute value of the alternating current after passage through the inverse notch filter extracted in Step S803 for 100 ms and computes a current integrated value (Step S804) and integrates an absolute value of the alternating-current voltage after passage through the inverse notch filter extracted in Step S803 for 100 ms and computes a voltage integrated value (Step S805).

Subsequently, the controller for fuel cell 10 divides the voltage integrated value obtained in Step S805 by the current integrated value obtained in Step S804 to compute the internal impedance of the fuel cell stack 6 (Step S806), finishes this FC impedance computation process and returns to the main process flow.

It should be noted that the FC impedance computation process is performed by the impedance calculation unit 11 of the controller for fuel cell 10. The calculated impedance is then output to the wet state estimation unit 13 in the subsequent stage and used to estimate the wet state in the fuel cell stack 6. Further, the calculated impedance is also output to the voltage control unit 14.

As described above, the power conditioning system 1 of the present embodiment includes the fuel cell stack 6 (fuel cell) connected to the drive motor 2 (including the drive inverter 3) serving as a load, the DC/DC converter (multi-phase converter) 5 for the fuel cell stack 6 connected between the fuel cell stack 6 and the drive inverter 3 and configured to convert the output voltage of the fuel cell stack 6 at the predetermined required voltage ratio, the high-voltage battery (secondary battery) 20 connected to the drive motor 2 in parallel to the fuel cell stack 6 and serving as a power supply source different from the fuel cell stack 6, and the DC/DC converter 8 for the battery 20 connected between the battery 20 and the drive inverter 3 and configured to convert the output voltage of the battery 20 at the predetermined required voltage ratio. Further, the current bypass path coupling the fuel cell stack 6 and the drive inverter 3 while bypassing the multi-phase converter 5 for the fuel cell stack 6 is provided in the power conditioning system 1 of the present embodiment. The power conditioning system 1 of the present embodiment includes, on the output sides of the multi-phase converter 5 and the DC/DC converter 8, the voltage control unit 14 functioning as the alternating-current voltage application unit configured to apply an alternating-current voltage signal generated by the DC/DC converter 8 for the battery 20 and the impedance calculation unit 11 and the wet state estimation unit 13 functioning as the internal state estimation unit configured to estimate the internal state of the fuel cell stack 6 on the basis of the predetermined physical quantities when the alternating-current voltage signal was applied by the voltage control unit 14 (alternating-current components close to 1 kHz of the output current and output voltage of the fuel cell stack 6 at the time of applying the alternating-current voltage signal in the present embodiment). Since the power conditioning system 1 of the present embodiment is configured to include the current bypass path, the following functions and effects are achieved.

Specifically, if the output voltage of the fuel cell stack 6 is not boosted by the multi-phase converter 5, e.g. if the DC link voltage adjusted by the DC/DC converter 8 is lower than the output voltage of the fuel cell stack 6, a part of the output current of the fuel cell stack 6 flows through this current bypass path. In such a situation, the alternating-current voltage signal for internal impedance measurement of the fuel cell stack 6 can be generated by the switching operation of the switching elements 82, 84 of the DC/DC converter 8 for the battery 20. In this case, since the multi-phase converter 5 for the fuel cell stack 6 is not boosting the output voltage of the fuel cell stack 6, the internal impedance of the fuel cell stack 6 can be measured without applying a large alternating-current voltage to the drive inverter 3. Since an excessive load is not applied to the multi-phase converter 5 for the fuel cell stack 6 in this way, heat generation of the multi-phase converter 5 can be suppressed (reduced).

In the power conditioning system 1 of the present embodiment, the voltage on the output side of the DC/DC converter 5 for the fuel cell stack 6, i.e. the DC link voltage, is set to be lower by the predetermined voltage β than the supply voltage to be applied to the drive motor 2 (drive inverter 3) serving as the load when the alternating-current voltage signal is not applied to the DC link voltage by the DC/DC converter 8. Specifically, in the present embodiment, the voltage control unit 14 of the controller for fuel cell 10 sets the DC link voltage command value at the time of applying the alternating-current voltage signal to be lower by the margin β than the DC link voltage command value set before the application of the alternating-current voltage signal. In the present embodiment, the flow of a current in a reverse direction along the current bypass path can be prevented by a simple control by configuring the power conditioning system 1 as just described. For example, in the case of generating an alternating-current voltage signal by the DC/DC converter 8 to measure the internal impedance of the fuel cell stack 6, the controller for fuel cell 10 has to grasp the state of each DC/DC converter 5, 8, the power required by the drive motor 2, the operating state of the fuel cell stack 6 and the like and output appropriate control signals to the DC/DC converter controller for fuel cell stack 4 and the DC/DC converter controller for battery 7. However, by setting the DC link voltage lower by the predetermined voltage β, a current backflow in the current bypass path can be effectively prevented without executing another detailed control.

In the power conditioning system 1 of the present embodiment, the current direction cut-off unit configured to cut off the flow of the current from the drive inverter 3 to the fuel cell stack 6 is provided on the current bypass path. By this current direction cut-off unit, the current does not flow in a reverse direction from the output side of the multi-phase converter 5, i.e. the input side of the drive inverter 3 to the fuel cell stack 6 when the voltage is boosted by the multi-phase converter 5. Thus, in such a situation, the power generation efficiency of the fuel cell stack 6 and efficiency to drive the drive motor 2 (so-called fuel economy) are wasted as little as possible.

Further, in the power conditioning system 1 of the present embodiment, the current direction cut-off unit may be constituted by a diode. This enables the current cut-off to be realized only by an inexpensive passive element without using an active element such as a switching element.

Comparative Example

Next, a comparative example of the power conditioning system of the first embodiment is briefly described to more reliably understand the present invention.

In the above first embodiment, the current bypass path for bypassing the multi-phase converter 5 is provided and the diode 100 is arranged on this current bypass path. In this comparative example, this current bypass path and the diode 100 are omitted as shown in FIG. 12.

Figure 12:
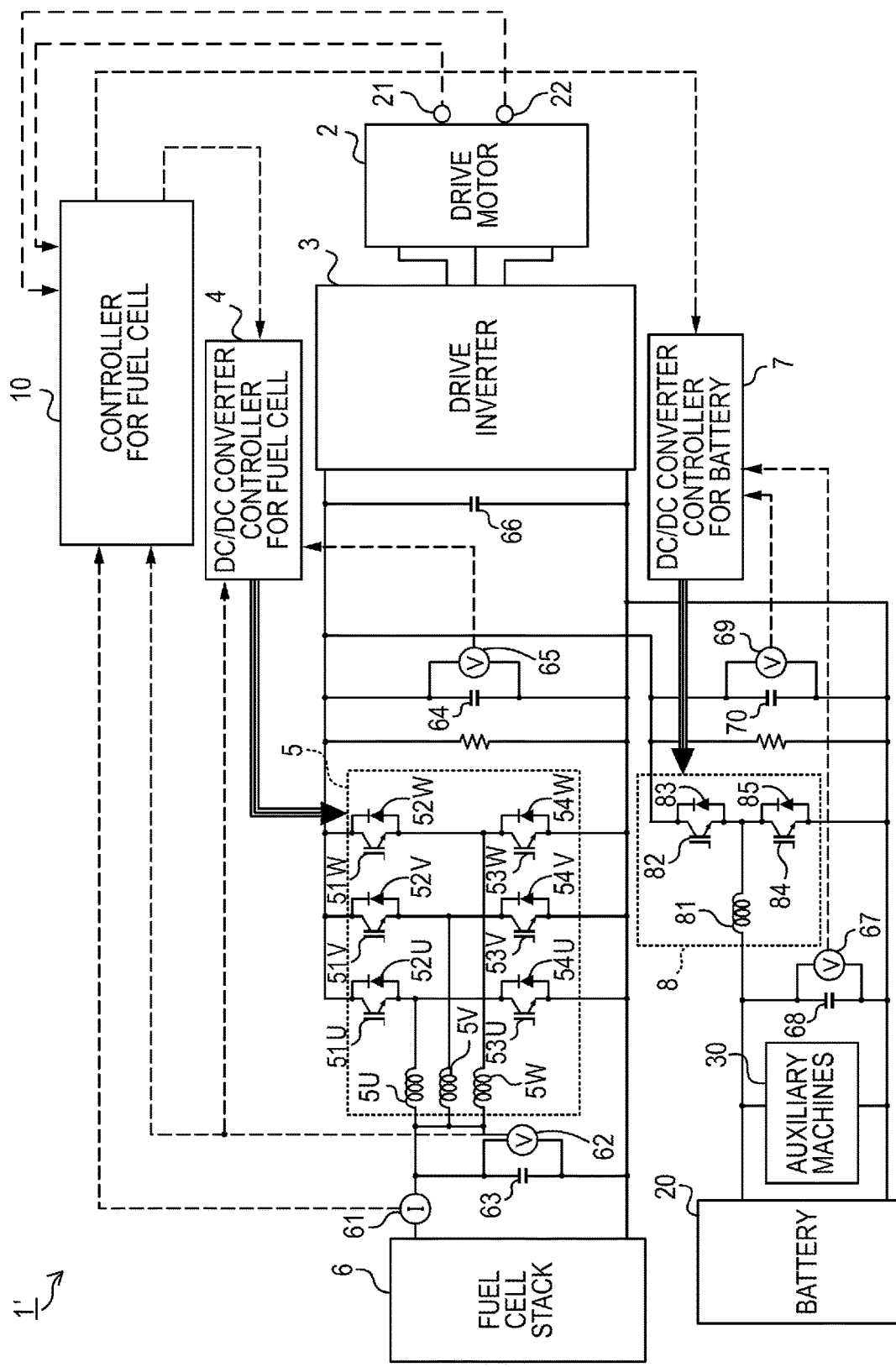
FIG. 12 is a diagram showing an overall configuration of a power conditioning system for fuel cell in a comparative example of the present invention.

FIG. 12 is a diagram showing an overall configuration of a power conditioning system for fuel cell 1' in the comparative example of the present invention. Components shown in FIG. 12 and configured as in the first embodiment are denoted by the same reference signs and not described in detail.

The power conditioning system 1' of this comparative example is not provided with a current bypass path for bypassing a multi-phase converter 5 as shown in FIG. 12. Thus, an alternating-current voltage signal generated by a DC/DC converter 8 and superimposed on a DC link voltage is applied to a fuel cell stack 6 via a high-impedance multi-phase converter 5. Therefore, a large amplitude needs to be set for the alternating-current voltage signal in consideration of voltage falling caused by the multi-phase converter 5.

Figure 13:
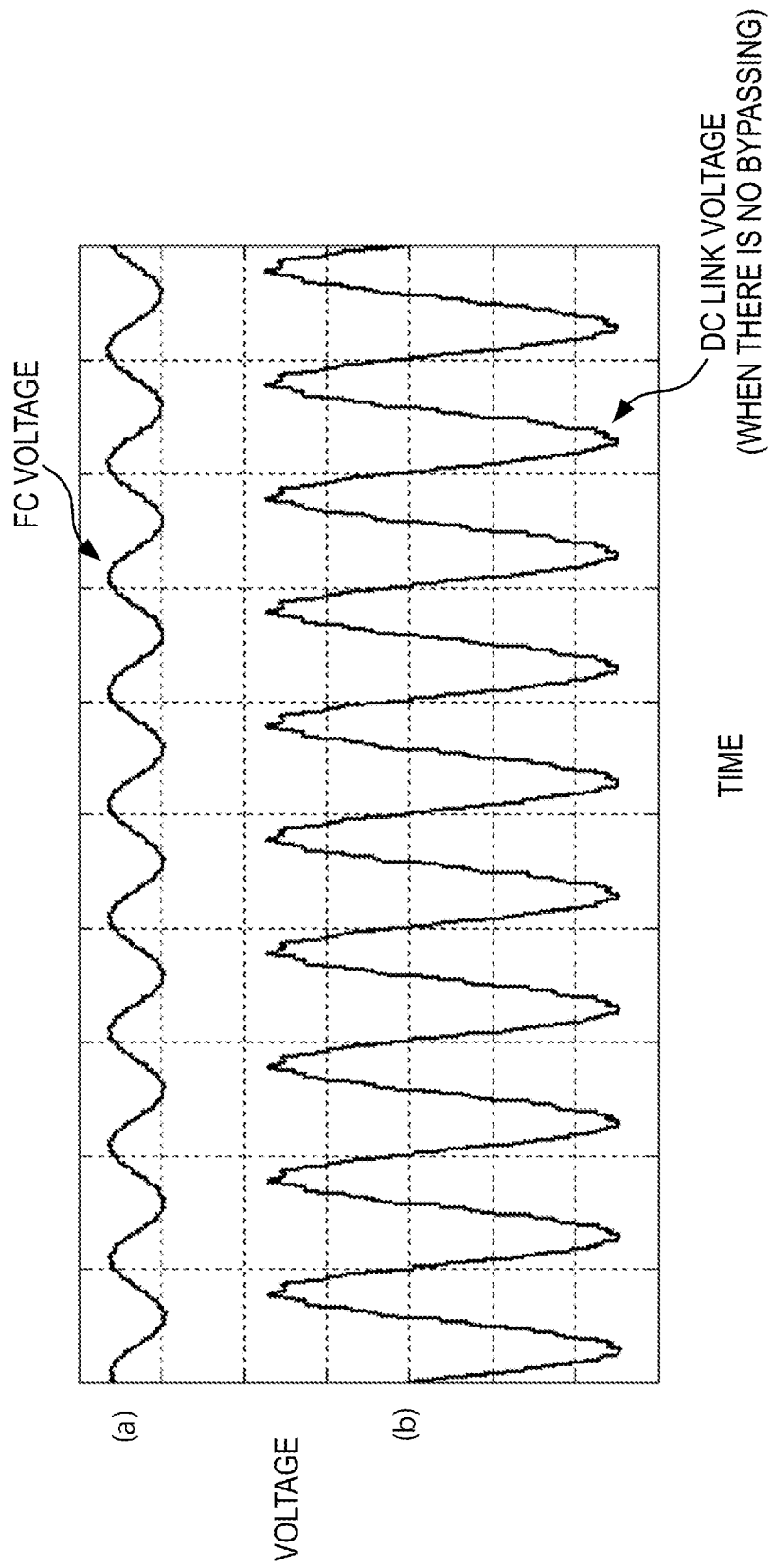
FIG. 13 is a graph showing waveforms of alternating-current voltage signals generated by a DC/DC converter for battery in the comparative example of the present invention.

FIG. 13 is a graph showing waveforms of alternating-current voltage signals generated by the DC/DC converter 8 for a battery 20 in the comparative example of the present invention. The alternating-current voltage signal (alternating-current voltage signal on a DC link voltage side) generated by the DC/DC converter 8 of the power conditioning system 1' of this comparative example is shown on a lower side (b) of FIG. 13, and the alternating-current voltage signal after the passage of the generated alternating-current voltage signal through the multi-phase converter 5 (after passage), i.e. the alternating-current voltage signal (alternating-current voltage signal on an FC voltage side) to be applied to a fuel cell stack 6 is shown on an upper side (a) of FIG. 13.

In the above first embodiment, the diode 100 is provided on the current bypass path. An impedance of the diode 100 with respect to an alternating-current voltage is sufficiently smaller than an impedance of the multi-phase converter 5.

Thus, in the case of providing the current bypass path for bypassing the multi-phase converter 5, the alternating-current voltage signal passes along this current bypass path and is applied to the fuel cell stack 6. Accordingly, the alternating-current voltage signal on the DC link voltage side can be set to have an amplitude about equal to that of the alternating-current voltage signal of a desired FC voltage.

On the other hand, since the current bypass path for bypassing the multi-phase converter 5 is not provided in the power conditioning system 1' of the comparative example, the amplitude of the alternating-current voltage signal on the DC link voltage side needs to be set about 5 to 10 times as large as that of the alternating-current voltage signal on the FC voltage side as shown in FIG. 13. This magnification is determined by the performance of the multi-phase converter 5, and the like.

Thus, as compared to the power conditioning system 1 of the above first embodiment, a relatively large alternating-current voltage is applied to the multi-phase converter 5 to cause heat generation of the multi-phase converter 5 in the power conditioning system 1' of the comparative example.

As just described, in the power conditioning system 1 of the above first embodiment, an amplitude of an alternating-current voltage signal needs not be increased in the case of generating the alternating-current voltage signal by the DC/DC converter 8. Thus, heat generation of the multi-phase converter 5 can be effectively prevented.

Second Embodiment

A second embodiment of the present invention is described below mainly on points of difference from the first embodiment. It should be noted that since an overall configuration of a power conditioning system 1 is similar, it is described using FIG. 1 and a functional configuration of a controller for fuel cell 10 is described using FIG. 14.

In the above first embodiment, the current bypass path for bypassing the multi-phase converter 5 is provided, the diode 100 is arranged on this current bypass path, and the alternating-current voltage signal (AC superimposed signal) for calculating the internal impedance of the fuel cell stack 6 is generated by the DC/DC converter 8 for the battery 20. In the present embodiment, an alternating-current voltage signal (AC superimposed signal) for calculating an internal impedance of a fuel cell stack 6 is generated by switching a DC/DC converter (multi-phase converter) 5 for the fuel cell stack 6 and a DC/DC converter 8 for a battery 20 on the basis of a required torque of a drive motor 2 serving as a load, an operating state of the fuel cell stack 6 and the like.

Figure 14:
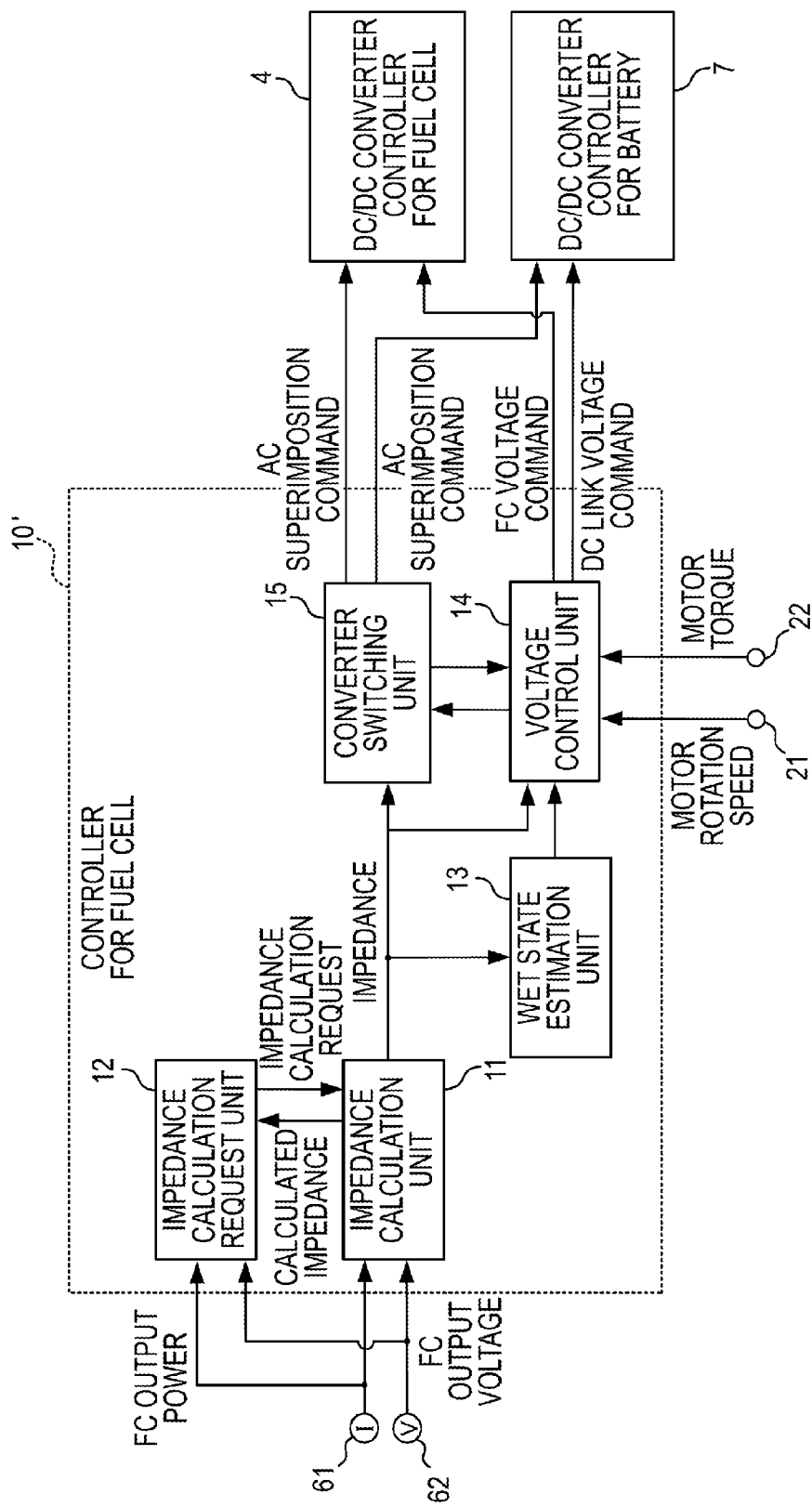
FIG. 14 is a block diagram showing a functional configuration of a controller for fuel cell in a second embodiment.

FIG. 14 is a diagram showing a functional configuration of a controller for fuel cell 10' in the second embodiment of the present invention. Components shown in FIG. 14 and configured as in the first embodiment are denoted by the same reference signs and not described in detail.

The controller for fuel cell 10' of the present embodiment further includes a converter switching unit 15 unlike the controller for fuel cell 10 of the above first embodiment, and a converter for generating an alternating-current voltage signal is switched between the multi-phase converter 5 and the DC/DC converter 8 by this converter switching unit 15. These points of difference are described in detail below.

An internal impedance of the fuel cell stack 6 calculated by an impedance calculation unit 11 is input to the converter switching unit 15, and drive information of the drive motor 2, an FC voltage command value and a DC link voltage command value are input thereto via a voltage control unit 14.

The converter switching unit 15 switches the multi-phase converter 5 for the fuel cell stack 6 and the DC/DC converter 8 for the battery 20 on the basis of these pieces of input information. Specifically, in a situation as in the above first embodiment, i.e. if the multi-phase converter 5 is not boosting an output voltage of the fuel cell stack 6, a switch is made to the DC/DC converter 8 by the converter switching unit 15.

On the other hand, if the multi-phase converter 5 is boosting the output voltage of the fuel cell stack 6, a switch is made to the multi-phase converter 5 by the converter switching unit 15. In the present embodiment, if a switch is made to the multi-phase converter 5 by the converter switching unit 15, an alternating-current voltage signal for internal impedance measurement of the fuel cell stack 6 is generated using switching elements 51U to 51W, 53U to 53W of the multi-phase converter 5.

Next, the operation of the power conditioning system 1' in the present embodiment is described. It should be noted that the overall control flow of the power conditioning system 1 in the first embodiment shown in FIG. 3 is similar also in the present embodiment and, hence, neither shown nor described. Out of the flow charts showing the subroutines of FIG. 3, those different from the first embodiment are described in detail below.

Figure 15:
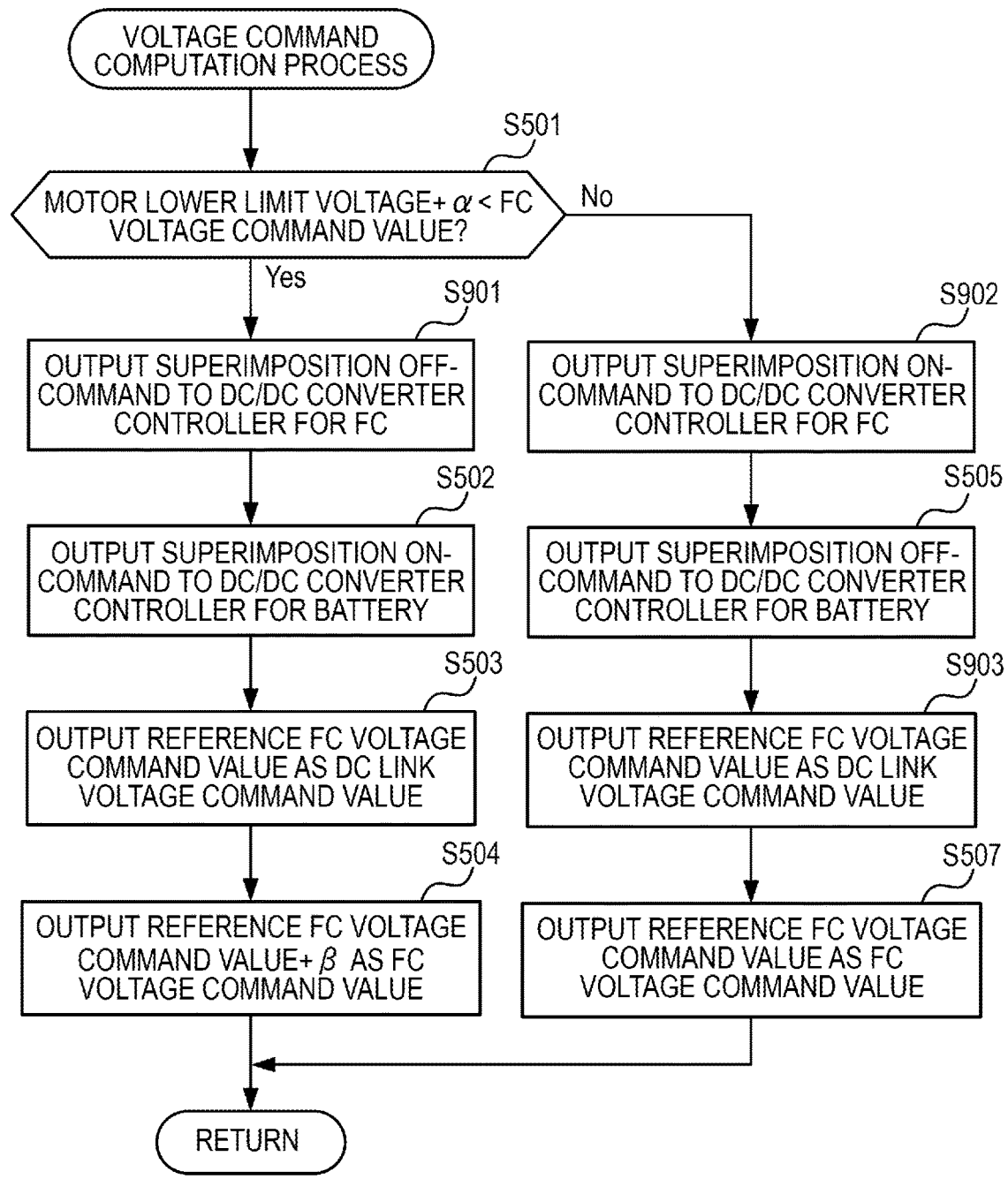
FIG. 15 is a flow chart showing a voltage command computation process performed by the controller for fuel cell in the second embodiment.

FIG. 15 is a flow chart showing a voltage command computation process performed by the controller for fuel cell 10' in the second embodiment. In the present embodiment, the DC/DC converters 5, 8 are switched on the basis of an operating state of the fuel cell stack 6 and the like by the converter switching unit 15, and an alternating-current voltage signal for internal impedance measurement of the fuel cell stack 6 is generated by the switched converter 5, 8.

In this voltage command computation process, the controller for fuel cell 10' first compares a motor lower limit voltage of the drive motor 2 determined by the motor lower limit voltage computation process shown in FIG. 6 of the first embodiment and an FC voltage command value computed by the reference FC voltage command computation process shown in FIG. 5 of the first embodiment. Then, the controller for fuel cell 10' determines whether or not the FC voltage command value is larger than a value obtained by adding a predetermined margin $\alpha$ to the motor lower limit voltage (Step S501).

If the FC voltage command value is determined to be larger than the motor lower limit voltage+$\alpha$, the controller for fuel cell 10' outputs a superimposition OFF-command to a DC/DC converter controller for fuel cell 4 (Step S901) and outputs a superimposition ON-command (i.e. AC superimposition command) to a DC/DC converter controller for battery 7 (Step S502). In this way, the DC/DC converter controller for fuel cell 4 having caused the multi-phase converter 5 to superimpose the alternating-current voltage signal finishes the superimposition of the alternating-current voltage signal.

Subsequently, the controller for fuel cell 10' outputs a reference FC voltage command value computed in Step S202 of the reference FC voltage command computation process as a DC link voltage command value to the DC/DC converter controller for battery 7 (Step S503).

Subsequently, the controller for fuel cell 10' outputs a value obtained by adding a predetermined margin $\beta$ to the reference FC voltage command value as a FC voltage command value to the DC/DC converter controller for fuel cell 4 (Step S504). Then, the controller for fuel cell 10' finishes this voltage command computation process and returns to the main process flow.

On the other hand, if the FC voltage command value is determined not to be larger than the motor lower limit voltage+α in Step S501, the controller for fuel cell 10' outputs a superimposition ON-command (i.e. AC superimposition command) to the DC/DC converter controller for fuel cell 4 (Step S902) and outputs a superimposition OFF-command to the DC/DC converter controller for battery 7 (Step S505). In this way, the DC/DC converter controller for battery 7 having caused the DC/DC converter 8 to superimpose the alternating-current voltage signal finishes the superimposition of the alternating-current voltage signal.

Further, the controller for fuel cell 10' outputs a value obtained by adding a predetermined margin γ to the reference FC voltage command value computed in Step S202 of the reference FC voltage command value computation process as a DC link voltage command value to the DC/DC converter controller for battery 7 (Step S903).

Subsequently, the controller for fuel cell 10' outputs the reference FC voltage command value as an FC voltage command value to the DC/DC converter controller for fuel cell 4 (Step S507). Then, the controller for fuel cell 10' finishes this voltage command value computation process and returns to the main process flow.

Here, the margin γ is briefly described. The margin γ in Step S903 means a margin for the FC voltage command value output by the controller for fuel cell 10' in Step S507. This margin γ is for preventing (DC link voltage)<(output voltage of the fuel cell stack 6) also at a lower limit value of the waveform of the alternating-current voltage signal by superimposing the alternating-current voltage signal generated by the multi-phase converter 5 on the input voltage of the drive inverter 3.

The reason for this is that the output voltage of the fuel cell stack 6 can be no longer boosted by the multi-phase converter 5 and the alternating-current voltage signal is insufficiently superimposed if the DC link voltage is lower than the output voltage of the fuel cell stack 6.

Specifically, this margin γ is determined through an experiment or the like in consideration of a detection error between the output voltage of the fuel stack cell 6 and the DC link voltage, an amplitude of the alternating-current voltage to be superimposed by the multi-phase converter 5, amplitudes of ripple voltage components generated by the switching operation of each switching elements 51U to 51W, 53U to 53W of the multi-phase converter 5 and the like.

It should be noted that the other margins α, β are not described here since being the same as the respective margins α, β in the above first embodiment.

Figure 16:
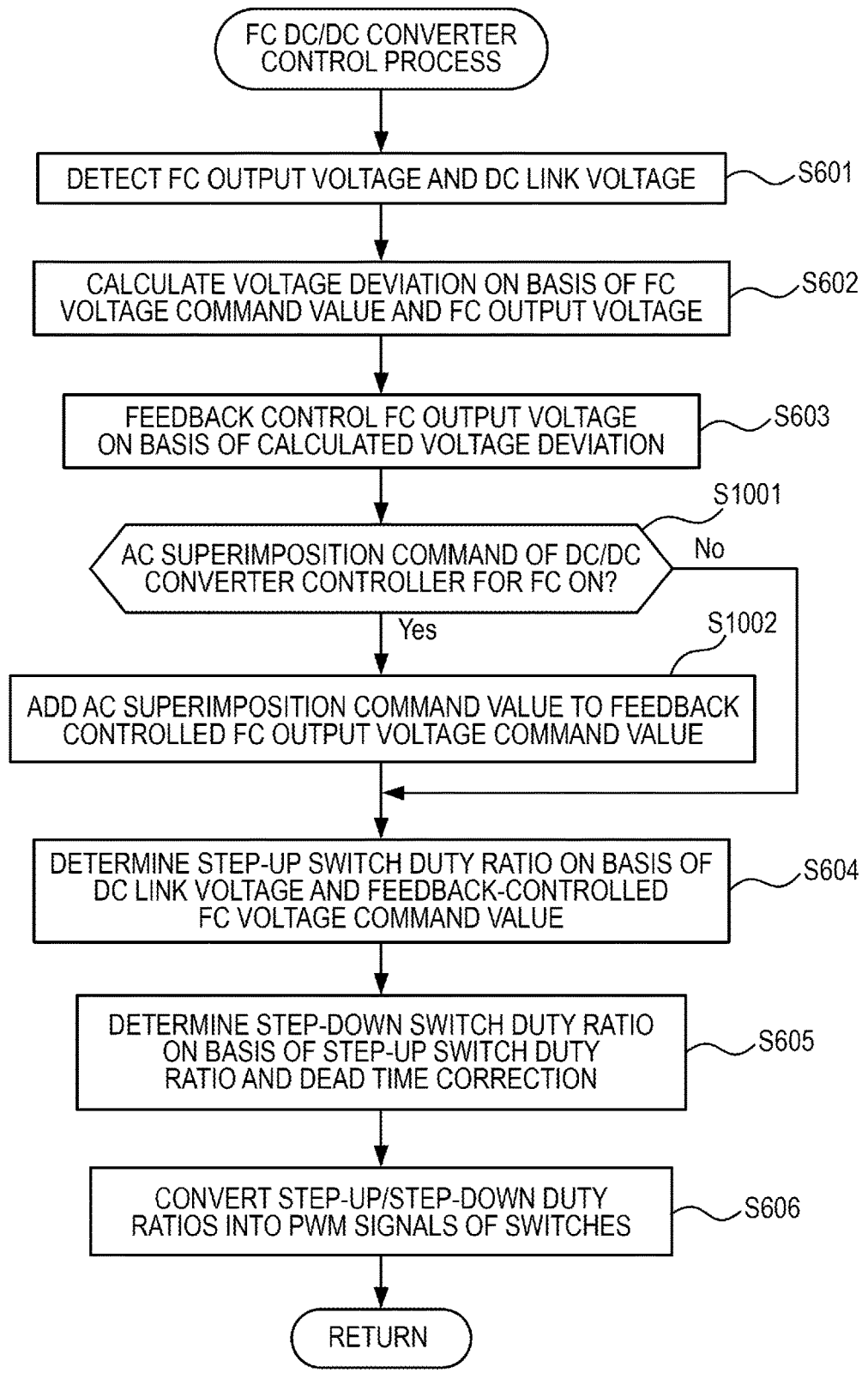
FIG. 16 is a flow chart showing an FC DC/DC converter control process performed by a DC/DC converter controller for fuel cell in the second embodiment.

FIG. 16 is a flow chart showing an FC DC/DC converter control process that is a subroutine corresponding to Step S6 of FIG. 3 and performed by the DC/DC converter controller for fuel cell 4.

In this FC DC/DC converter control process, the DC/DC converter controller for fuel cell 4 detects the output voltage of the fuel cell stack 6, the output voltage of the multi-phase converter 5, i.e. the DC link voltage, by voltage sensors 62, 65 (Step S601).

Subsequently, the DC/DC converter controller for fuel cell 4 calculates a voltage deviation of the output voltage of the fuel cell stack 6 on the basis of the FC voltage command value input from the controller for fuel cell 10' and the detected output voltage value of the fuel cell stack 6 (Step S602). This voltage deviation is obtained based on a difference between the FC voltage command value and the detected output voltage value of the fuel cell stack 6.

Subsequently, the DC/DC converter controller for fuel cell 4 executes a voltage feedback control based on a PI control for the output voltage of the fuel cell stack 6 (i.e. input/output voltage ratio of the multi-phase converter 5) on the basis of the voltage deviation of the fuel cell stack 6 calculated in Step S602 (Step S603).

Subsequently, the DC/DC converter controller for fuel cell 4 determines whether or not the AC superimposition command to the multi-phase converter 5 is ON (Step S1001). If the AC superimposition command is determined not to be ON, the DC/DC converter controller for fuel cell 4 transitions to Step S604 without performing a processing of AC superimposition.

On the other hand, if the AC superimposition command is determined to be ON, the DC/DC converter controller for fuel cell 4 adds an AC superimposition command value for generating an alternating-current voltage signal for internal impedance measurement of the fuel cell stack 6 to the feedback controlled output voltage command value of the fuel cell stack 6 determined in Step S603 (Step S1002).

Subsequently, the DC/DC converter controller for fuel cell 4 determines a duty ratio of a step-up switch (lower stage) on the basis of the DC link voltage and the feedback controlled FC voltage command value (Step S604) and determines a duty ratio of a step-down switch (upper stage) on the basis of the duty ratio of the step-up switch (lower stage) determined in this way and a dead time correction (Step S605).

Subsequently, the DC/DC converter controller for fuel cell 4 converts the step-up duty ratio and step-down duty ratio determined in Step S604, S605 into PWM signals to be output to each switching element 51U to 51W, 53U to 53W or generates the PWM signals from the step-up duty ratio and step-down duty ratio (Step S606). Then, DC/DC converter controller for fuel cell 4 outputs these PWM signals to the corresponding switching elements 51U to 51W, 53U to 53W, finishes this FC DC/DC converter control process and returns to the main process flow.

As described above, as in the above first embodiment, the power conditioning system 1' of the present embodiment includes the fuel cell stack 6 (fuel cell) connected to the drive motor 2 (including the drive inverter 3) serving as a load, the DC/DC converter for fuel cell (multi-phase converter) 5 connected between the fuel cell stack 6 and the drive inverter 3 and configured to convert the output voltage of the fuel cell stack 6 at a predetermined required voltage ratio, the high-voltage battery (secondary battery) 20 connected to the drive motor 2 in parallel to the fuel cell stack 6 and serving as a power supply source different from the fuel cell stack 6, and the DC/DC converter 8 for the battery 20 connected between the battery 20 and the drive inverter and configured to convert the output voltage of the battery 20 at a predetermined required voltage ratio. Further, the current bypass path coupling the fuel cell stack 6 and the drive inverter 3 while bypassing the multi-phase converter 5 for the fuel cell stack 6 is provided in the power conditioning system 1' of the present embodiment. The power conditioning system 1' of the present embodiment includes, on the output sides of the multi-phase converter 5 and the DC/DC converter 8, the voltage control unit 14 functioning as an alternating-current voltage application unit configured to apply an alternating-current voltage signal generated by the DC/DC converter 8 for the battery 20 and the impedance calculation unit 11 and a wet state estimation unit 13 functioning as an internal state estimation unit configured to estimate an internal state of the fuel cell stack 6 on the basis of predetermined physical quantities when the alternating-current voltage signal was applied by the voltage control unit 14 (alternating-current components close to 1 kHz of the output current and output voltage of the fuel cell stack 6 at the time of applying the alternating-current voltage signal in the present embodiment). Further, the power conditioning system 1' of the present embodiment further includes the converter switching unit 15 configured to switch between the multi-phase converter 5 for the fuel cell stack 6 and the DC/DC converter 8 for the battery 20 according to the operating state of the fuel cell stack 6 and power required by the drive motor 2, and the voltage control unit 14 sewing as the alternating-current voltage application unit is configured to apply the alternating-current voltage signal to the output side of the multi-phase converter 5 by controlling the drive of the multi-phase converter 5 or the DC/DC converter 8 switched by the converter switching unit 15. Specifically, in the present embodiment, the internal impedance of the fuel cell stack 6 is calculated by the impedance calculation unit 11 in the controller for fuel cell 10' by superimposing the alternating-current voltage signal generated by the multi-phase converter 5 on the output voltage of the multi-phase converter 5 boosted by the multi-phase converter 5.

Since the power conditioning system 1' of the present embodiment is configured as just described, the alternating-current voltage signal for internal impedance measurement of the fuel cell stack 6 can be generated by switching between the multi-phase converter 5 and the DC/DC converter 8 if necessary in addition to the effects obtained by the power conditioning system 1 of the above first embodiment. This enables heat generation of each DC/DC converter 5, 8 to be reduced as compared to the case where only either one of the DC/DC converters 5, 8 is used.

In the power conditioning system 1' of the present embodiment, when a switch is made to the DC/DC converter 8 for the battery 20 by the converter switching unit 15, the voltage on the output side of the multi-phase converter 5 for the fuel cell stack 6, i.e. the DC link voltage, is set to be lower by the predetermined voltage $\beta$ than a supply voltage to be applied to the drive motor 2 (drive inverter 3) serving as the load before the application of the alternating-current voltage signal. Specifically, the DC link voltage is set to be lower by the predetermined voltage $\beta$. This can prevent the flow of a current in a reverse direction along the current bypass path by a simple control as in the case of the first embodiment.

In the power conditioning system 1' of the present embodiment, the converter switching unit 15 is configured such that a switch is made to the multi-phase converter 5 for the fuel cell stack 6 if the multi-phase converter 5 for the fuel cell stack 6 is boosting the output voltage of the fuel cell stack 6. If the multi-phase converter 5 is performing a boosting operation, an alternating-current voltage signal can be generated in accordance with that operation. Thus, it is advantageous to superimpose the alternating-current voltage signal by the multi-phase converter 5 closer to the output terminal of the fuel cell stack 6. Further, by performing the AC superimposition by the multi-phase converter 5 during the boosting operation of the multi-phase converter 5, an alternating-current voltage to be applied to the drive inverter 3 can be reduced relative to an alternating-current voltage to be applied to the fuel cell stack 6. In this way, fluctuations of the supply voltages to the drive motor 2 and the drive inverter 3 can be effectively suppressed.

In the power conditioning system 1' of the present embodiment, when a switch is made to the multi-phase converter 5 for the fuel cell stack 6 by the converter switching unit 15, the voltage on the output side of the multi-phase converter 5 for the fuel cell stack 6, i.e. the DC link voltage, is set to be higher by the predetermined voltage $\gamma$ than the supply voltage to be applied to the drive motor 2 (drive inverter 3) serving as the load before the application of the alternating-current voltage signal. Specifically, the DC link voltage is set to be higher by the predetermined voltage $\gamma$. This enables the configuration of the present invention to be realized in a power conditioning system of a type that boosts the fuel cell stack 6 by a simple control.

For example, in the case of generating an alternating-current voltage signal by the multi-phase converter 5 to measure the internal impedance of the fuel cell stack 6 when the output voltage of the fuel cell stack 6 is boosted, the controller for fuel cell 10' has to grasp the state of each DC/DC converter 5, 8, the power required by the drive motor 2, the operating state of the fuel cell stack 6 and the like and output appropriate control signals to the DC/DC converter controller for fuel cell stack 4 and the DC/DC converter controller for battery. However, by setting the DC link voltage higher by the predetermined voltage $\gamma$, the alternating-current voltage signal for internal impedance measurement of the fuel cell stack 6 can be generated by the multi-phase converter 5 and sufficiently superimposed on the DC link voltage without executing another detailed control.

Although the embodiments of the present invention have been described above, the above embodiments are merely an illustration of some application examples of the present invention and not intended to limit the technical scope of the present invention to the specific configurations of the above embodiments.

In the above first and second embodiments, a case has been described where the multi-phase converter 5 is used as the DC/DC converter for boosting the output voltage of the fuel cell stack 6. However, the present invention is not limited to this. A single-phase converter like the DC/DC converter 8 may be used as the converter for the fuel cell stack 6 as long as the generation of an alternating-current voltage signal by switching elements is possible.

Contrary to that, the DC/DC converter 8 for boosting the output voltage of the battery 20 may be constituted by a multi-phase converter as long as the generation of an alternating-current voltage signal by switching elements is possible.

Further, in the above first and second embodiments, the controller for fuel cell 10, 10' has been configured to include the impedance calculation request unit 12. However, the present invention is not limited to such a configuration and the impedance calculation request unit 12 may be omitted. In this case, the internal impedance of the fuel cell stack 6 may be constantly calculated or may be calculated at appropriate time intervals without depending on the operating state of the fuel cell stack 6.

The invention claimed is:
1. A power conditioning system, comprising:
  a fuel cell connected to a load;
  a fuel cell converter connected between the fuel cell and the load, the fuel cell converter converting an output voltage of the fuel cell at a predetermined required voltage ratio;
  a battery connected to the load in parallel to the fuel cell, the battery serving as a power supply source different from the fuel cell;
  a battery converter connected between the battery and the load, the battery converter converting an output voltage of the battery at a predetermined required voltage ratio;

a current bypass path configured to couple the fuel cell and the load while bypassing the fuel cell converter; and a controller programmed to:
   apply an alternating-current voltage signal to an output side of the fuel cell converter; and
   estimate an internal state of the fuel cell on the basis of a predetermined physical quantity when the alternating-current voltage signal was applied by the controller.

2. The power conditioning system according to claim 1, further comprising:
   a converter switching unit configured to switch between the fuel cell converter and the battery converter according to an operating state of the fuel cell and power required by the load, wherein:
   the controller is further programmed to apply applies the alternating-current voltage signal to the output side of the fuel cell converter by controlling the drive of the fuel cell converter or the battery converter switched by the converter switching unit.

3. The power conditioning system according to claim 2, wherein:
   a voltage on the output side of the fuel cell converter is set to be lower by a predetermined voltage than a supply voltage to be applied to the load before the application of the alternating-current voltage signal when a switch is made to the battery converter by the converter switching unit.

4. The power conditioning system according to claim 1, further comprising:
   a current direction cut-off unit on the current bypass path, the current direction cut-off unit cutting off the flow of a current from the load to the fuel cell.

5. The power conditioning system according to claim 4, wherein:
   the current direction cut-off unit is constituted by a diode.

6. The power conditioning system according to claim 2, wherein:
   a switch is made to the fuel cell converter by the converter switching unit if the fuel cell converter is increasing the output voltage of the fuel cell.

7. The power conditioning system according to claim 6, wherein:
   the voltage on the output side of the fuel cell converter is set to be higher by a predetermined voltage than a supply voltage to be applied to the load when the alternating-current voltage signal is not applied if a switch is made to the fuel cell converter by the converter switching unit.

8. The power conditioning system according to claim 1, wherein:
   the predetermined physical quantity includes at least an alternating-current component of an alternating current of the fuel cell or an alternating-current component of the output voltage of the fuel cell close to a predetermined frequency of the alternating-current voltage signal when the alternating-current voltage signal is applied.

9. A control method for a power conditioning system with:
   a fuel cell connected to a load;
   a fuel cell converter connected between the fuel cell and the load, the fuel cell converter converting an output voltage of the fuel cell at a predetermined required voltage ratio;
   a battery connected to the load in parallel to the fuel cell, the battery serving as a power supply source different from the fuel cell;
   a battery converter connected between the battery and the load; and
   a current bypass path configured to couple the fuel cell and the load while bypassing the fuel cell converter,
   the control method comprising:
      applying an alternating-current voltage signal to an output side of the fuel cell converter; and
      estimating an internal state of the fuel cell on the basis of a predetermined physical quantity when the alternating-current voltage signal is applied.

10. The control method according to claim 9, wherein:
    the predetermined physical quantity includes at least an alternating-current component of an alternating current of the fuel cell or an alternating-current component of the output voltage of the fuel cell close to a predetermined frequency of the alternating-current voltage signal when the alternating-current voltage signal is applied.

11. The control method according to claim 9, wherein the alternating-current voltage signal is applied to the output side of the fuel cell converter while an output current of the fuel cell flows through the current bypass path.

12. The power conditioning system according to claim 1, wherein the controller is further programmed to apply the alternating-current voltage signal to the output side of the fuel cell converter while an output current of the fuel cell flows through the current bypass path.

* * * * *